United States Patent
Beall et al.

(10) Patent No.: US 11,148,968 B2
(45) Date of Patent: *Oct. 19, 2021

(54) HIGH STRENGTH GLASS-CERAMICS HAVING PETALITE AND LITHIUM SILICATE STRUCTURES

(71) Applicant: CORNING INCORPORATED, Corning, NY (US)

(72) Inventors: George Halsey Beall, Big Flats, NY (US); Qiang Fu, Painted Post, NY (US); Charlene Marie Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/835,878

(22) Filed: Mar. 31, 2020

(65) Prior Publication Data

US 2020/0231491 A1 Jul. 23, 2020

Related U.S. Application Data

(60) Division of application No. 16/564,340, filed on Sep. 9, 2019, which is a division of application No. (Continued)

(51) Int. Cl.
*C03C 10/00* (2006.01)
*C03B 32/02* (2006.01)
(Continued)

(52) U.S. Cl.
CPC .......... *C03C 10/0027* (2013.01); *C03B 32/02* (2013.01); *C03C 3/097* (2013.01);
(Continued)

(58) Field of Classification Search
None
See application file for complete search history.

(56) References Cited

U.S. PATENT DOCUMENTS

| 3,246,972 A | 4/1966 | Smith |
| 3,681,097 A | 8/1972 | Beall et al. |

(Continued)

FOREIGN PATENT DOCUMENTS

| CN | 1723176 A | 1/2006 |
| CN | 1955131 A | 5/2007 |

(Continued)

OTHER PUBLICATIONS

CN201580065414.5 First Office Action dated Apr. 3, 2019, China Patent Office.
(Continued)

*Primary Examiner* — David Sample
(74) *Attorney, Agent, or Firm* — Jeffrey A. Schmidt

(57) ABSTRACT

Glass and glass ceramic compositions having a combination of lithium silicate and petalite crystalline phases along with methods of making the glass and glass ceramic compositions are described. The compositions are compatible with conventional rolling and float processes, are transparent or translucent, and have high mechanical strength and fracture resistance. Further, the compositions are able to be chemically tempered to even higher strength glass ceramics that are useful as large substrates in multiple applications.

22 Claims, 15 Drawing Sheets

Related U.S. Application Data

16/181,815, filed on Nov. 6, 2018, now Pat. No. 10,427,975, which is a continuation of application No. 15/904,926, filed on Feb. 26, 2018, now Pat. No. 10,189,741, which is a continuation of application No. 14/878,133, filed on Oct. 8, 2015, now Pat. No. 10,239,780.

(60) Provisional application No. 62/205,120, filed on Aug. 14, 2015, provisional application No. 62/061,385, filed on Oct. 8, 2014.

(51) Int. Cl.
    *C03C 21/00*     (2006.01)
    *C03C 4/02*     (2006.01)
    *C03C 3/097*     (2006.01)

(52) U.S. Cl.
    CPC ............ *C03C 4/02* (2013.01); *C03C 10/0054* (2013.01); *C03C 21/002* (2013.01); *C03C 2204/00* (2013.01)

(56) References Cited

U.S. PATENT DOCUMENTS

| | | | |
|---|---|---|---|
| 5,219,799 A | 6/1993 | Beall et al. | |
| 5,872,069 A | 2/1999 | Abe | |
| 6,174,827 B1 | 1/2001 | Goto et al. | |
| 6,270,876 B1 | 8/2001 | Abe et al. | |
| 6,284,340 B1 * | 9/2001 | Abe .................... | C03C 10/0027 428/141 |
| 6,376,402 B1 | 4/2002 | Pannhorst et al. | |
| 6,383,645 B1 | 5/2002 | Goto et al. | |
| 6,420,286 B1 | 7/2002 | Goto et al. | |
| 6,455,451 B1 | 9/2002 | Brodkin et al. | |
| 6,458,728 B1 | 10/2002 | Nagata et al. | |
| 6,514,890 B1 | 2/2003 | Nagata et al. | |
| 6,517,623 B1 | 2/2003 | Brodkin et al. | |
| 6,524,982 B1 | 2/2003 | Nagata et al. | |
| 6,593,257 B1 | 7/2003 | Nagata et al. | |
| 6,593,258 B1 | 7/2003 | Shimatani et al. | |
| 6,802,894 B2 | 10/2004 | Brodkin et al. | |
| 8,114,795 B2 | 2/2012 | Yagi et al. | |
| 8,444,756 B2 | 5/2013 | Schweiger et al. | |
| 8,956,987 B2 | 2/2015 | Durschang et al. | |
| 8,986,841 B2 | 3/2015 | Pelletier et al. | |
| 8,993,464 B2 | 3/2015 | Gabel et al. | |
| 9,249,045 B2 | 2/2016 | Gabel et al. | |
| 9,321,672 B2 | 4/2016 | Shiratori et al. | |
| 9,556,062 B2 | 1/2017 | Ogawa et al. | |
| 9,688,568 B2 | 6/2017 | Borczuch-Laczka et al. | |
| 9,809,488 B2 * | 11/2017 | Beall .................... | C03C 21/002 |
| 10,189,741 B2 * | 1/2019 | Beall .................... | C03C 3/097 |
| 10,239,780 B2 * | 3/2019 | Beall .................... | C03C 10/0054 |
| 10,427,975 B2 * | 10/2019 | Beall .................... | C03C 21/002 |
| 10,723,649 B2 | 7/2020 | Beall et al. | |
| 2002/0137618 A1 | 9/2002 | Goto et al. | |
| 2005/0096208 A1 | 5/2005 | Zachau et al. | |
| 2007/0082294 A1 | 4/2007 | Goto et al. | |
| 2007/0093375 A1 | 4/2007 | Nakajima | |
| 2008/0248316 A1 | 10/2008 | Goto et al. | |
| 2009/0118113 A1 | 5/2009 | Toshitaka | |
| 2009/0162608 A1 | 6/2009 | Yagi et al. | |
| 2009/0270242 A1 | 10/2009 | Yanase et al. | |
| 2010/0035038 A1 | 2/2010 | Barefoot et al. | |
| 2011/0092353 A1 | 4/2011 | Amin et al. | |
| 2011/0212824 A1 | 9/2011 | Almoric et al. | |
| 2013/0045375 A1 | 2/2013 | Gross | |
| 2013/0201678 A1 | 8/2013 | Siebers et al. | |
| 2014/0134397 A1 | 5/2014 | Amin et al. | |
| 2014/0238078 A1 | 8/2014 | Boek et al. | |
| 2015/0099124 A1 | 4/2015 | Beunet et al. | |
| 2015/0111717 A1 | 4/2015 | Gabel et al. | |
| 2015/0274581 A1 | 10/2015 | Beall et al. | |
| 2015/0368147 A1 | 12/2015 | Dejneka et al. | |
| 2015/0376054 A1 | 12/2015 | Beall et al. | |
| 2016/0159682 A1 | 6/2016 | Borczuch-Laczka et al. | |
| 2016/0185653 A1 | 6/2016 | Fushie | |

FOREIGN PATENT DOCUMENTS

| | | | | |
|---|---|---|---|---|
| CN | 101279818 A | 10/2008 | | |
| CN | 102741186 A | 10/2012 | | |
| CN | 103265188 A | 8/2013 | | |
| CN | 103476723 A | 12/2013 | | |
| CN | 104108883 A | 10/2014 | | |
| CN | 102690059 B | 8/2016 | | |
| DE | 262851 A1 | 12/1988 | | |
| GB | 2284655 A | 6/1995 | | |
| JP | 10-212132 A | 8/1998 | | |
| JP | 11000002 A | 1/1999 | | |
| JP | 11000004 A | 1/1999 | | |
| JP | 2001-035417 A | 2/2001 | | |
| JP | 2001126236 A | 5/2001 | | |
| JP | 2005-062832 A | 3/2005 | | |
| JP | 2008-522935 A | 7/2008 | | |
| JP | 2009-114005 A | 5/2009 | | |
| JP | 04726400 B2 | 7/2011 | | |
| JP | 2013-521203 A | 6/2013 | | |
| JP | 05762707 B2 | 8/2015 | | |
| JP | 2017518940 A | 7/2017 | | |
| JP | 2019212061 A | 12/2019 | | |
| JP | 2019212062 A | 12/2019 | | |
| TW | 200409739 A | 6/2004 | | |
| TW | 200533623 A | 10/2005 | | |
| TW | 200724506 A | 7/2007 | | |
| TW | 201228980 A | 7/2012 | | |
| WO | 0222767 A2 | 3/2002 | | |
| WO | 2012121116 A1 | 9/2012 | | |
| WO | WO-2012121116 A1 * | 9/2012 | ......... | C03C 10/0027 |
| WO | 2012143137 A1 | 10/2012 | | |
| WO | WO-2012143137 A1 * | 10/2012 | ............ | C03C 3/097 |
| WO | 2013/107653 A2 | 7/2013 | | |
| WO | 2016057285 A1 | 4/2016 | | |
| WO | 2020161949 A1 | 8/2020 | | |

OTHER PUBLICATIONS

Taiwanese Patent Application No. 108137988; English Translation of the Notice of Allowance and Search Report dated Nov. 19, 2019; Taiwan Patent Office; 3 Pgs.

Taiwanese Patent Application No. 108138021; English Translation of the Notice of Allowance and Search Report dated Nov. 27, 2019; Taiwan Patent Office; 3 Pgs.

Korean Patent Application No. 20177012476; English Translation of the Office Action dated Dec. 9, 2019; Korea Patent Office; 2 Pgs.

Japanese Patent Application No. 2017518940; Notice of Allowance dated Feb. 12, 2020; Japan Patent Office; 3 Pgs.

European Patent Application No. 19179243.1 Extended Search Report dated Feb. 13, 2020; 6 Pages; European Patent Office.

Beall et al; "Nanophase Glass-Ceramics," J Am Ceram Soc, 1999, 82: 5-16.

Beall, "Design and Properties of Glass-Ceramics," Annu Rev Mater Sci, 1992, 22: 91-119.

English Translation of CN201910857647.9 Office Action dated Mar. 19, 2020; 10 Pages; Chinese Patent Office.

English Translation of International Publication No. WO 2012/121116 A1, published Sep. 13, 2012, 28 pgs.

European Patent Application No. 15784247.7 Office Action dated Nov. 19, 2018; 16 Pages; European Patent Office.

Hummel, "Thermal Expansion Properties of Some Synthetic Lithia Minerals," J Am Ceram Soc, 1951, 34: 35-239.

International Search Report and Written Opinion of the International Searching Authority; PCT/US2015/054615; dated Feb. 17, 2016.

Morimoto & Emem, "Strength of $Li_2O$—$Si_2O$-System transparent glass-ceramics," Journal of the Cermic Society of Japan 112(5), pp. 259-262, 2004.

(56) References Cited

OTHER PUBLICATIONS

Park, et al; "Heat-Resistant Ceramics Based on LAS-System Non-Metallic Mineral and Its Thermal Shock Resistance," J Ceram Soc Jpn, 2010, 118: 220-225.

Roy et al; "Compositional and Stability Relationships Among the Lithium Aluminosilicates: Eucryptite, Spodumene and Petalite" ; J Am Ceram Soc, 1950 33, 152-159.

Yatongchai & Morimoto, "Strengthening of $Li_2O$—$25iO_2$ transparent glass-ceramics by ion exchange," Journal of the Ceramic Society of Japan 114(3), pp. 227-229, 2006.

English Translation of CN201910857647.9 Office Action dated Sep. 17, 2020; 10 Pages; Chinese Patent Office.

Jewelry and Jade Identification Dictionary "; Shanghai Science and Technology Press, 2nd Edition, p. 186".

Japanese Patent Application No. 2020-011444 Notification of Grounds of Rejection dated Dec. 17, 2020; 14 Pages ( 7 pages of English Translation and 7 pages of Original Document) Japanese Patent Office.

Sapphirine: Mineral information, data and localities, Available Online at (https://www.mindat.org/min-3531.html), 2021, 16 pages.

Zanotto Edgar Dutra, "A bright future for glass-ceramics," American Ceramic Society Bulletin, vol. 89, No. 9, 2010, pp. 19-27.

European Patent Application No. 20211154.8 Search Report and Search Opinion dated Feb. 25, 2021; 8 Pages; European Patent Office.

Korean Patent Application No. 10-2020-7003334, Office Action dated Apr. 27, 2021, 11 pages (4 pages of English Translation and 7 pages of Original Document), Korean Patent Office.

Chinese Patent Application No. 202010092940.3, Office Action dated Jun. 4, 2021, 20 pages (4 pages of English Translation and 16 pages of Original Document), Chinese Patent Office.

Japanese Patent Application No. 2020-011444 Office Action dated Aug. 11, 2021, 5 pages (2 pages of English Translation and 3 pages of Original Document); Japanese Patent Office.

Taiwanese Patent Application No. 110102933, Office Action dated Jun. 10, 2021, 4 pages (English Translation Only); Taiwanese Patent Office.

Taiwanese Patent Application No. 110102937, Office Action dated Jun. 11, 2021, 3 pages (English Translation Only); Taiwanese Patent Office.

Taiwanese Patent Application No. 110102940, Office Action dated Jun. 9, 2021, 3 pages (English Translation Only); Taiwanese Patent Office.

\* cited by examiner

HIGH STRENGTH GLASS-CERAMICS HAVING PETALITE AND LITHIUM SILICATE STRUCTURES

CROSS-REFERENCE TO RELATED APPLICATIONS

This application is a divisional application and claims the benefit of priority under 35 U.S.C. § 120 of U.S. application Ser. No. 16/564,340 filed on Sep. 9, 2019, which in turn, is a divisional application and claims the benefit of priority under 35 U.S.C. § 120 of U.S. application Ser. No. 16/181,815 filed on Nov. 6, 2018, now patent Ser. No. 10/427,975 granted Oct. 1, 2019, which in turn, is a continuation of U.S. application Ser. No. 15/904,926 filed on Feb. 26, 2018, now patent Ser. No. 10/189,741 granted Jan. 29, 2019, which is a continuation of U.S. application Ser. No. 14/878,133 filed on Oct. 8, 2015, now patent Ser. No. 10/239,780 granted Mar. 26, 2019, which claims the benefit of priority under 35 U.S.C. § 119 of U.S. Provisional Application Ser. No. 62/205,120 filed on Aug. 14, 2015 and 62/061,385 filed on Oct. 8, 2014, the contents of each of which are relied upon and incorporated herein by reference in their entireties.

BACKGROUND

Field

Embodiments relate to glass and glass ceramic compositions and in particular, to high strength glass ceramic compositions having a combination of petalite and lithium silicate phases.

Technical Background

Lithium disilicate glass-ceramics in the $SiO_2$—$Li_2O$—$K_2O$—$ZnO$—$P_2O_5$—$Al_2O_3$—$ZrO_2$ system have been developed and sold for use as dental crowns, bridges, and overlays. Their microstructures of interlocking tabular crystals provide high mechanical strength and fracture toughness and excellent chemical durability. Compositions in this area were invented at Corning, Inc. and patented by Beall et al. in U.S. Pat. No. 5,219,799 ("the '799 patent").

In addition, known glass-based materials often exhibit intrinsic brittleness or low resistance to crack propagation. For example, an inherently low fracture toughness (e.g., 0.5-1.0 $MPa \cdot m^{1/2}$ for oxide glass and glass ceramics) makes oxide glass sensitive to the presence of small defects and flaws. As a comparison point, commercially available single-crystal substrates exhibit a fracture toughness value in the range from about 2.4 to about 4.5 $MPa \cdot m^{1/2}$. Chemical strengthening by, for example, ion exchange processes can provide some resistance to crack penetration at the surface of a glass or glass ceramic by imposing a compressive stress layer in the glass or glass ceramic to a depth (e.g., 50-100 μm) from the surface; however, the crack penetration resistance may be limited and is no longer effective once a crack propagates through the compressive stress layer into the bulk of the glass or glass ceramic. While the strengthening provides some resistance to crack penetration, the intrinsic property of the material (k1c) is not affected by ion exchange. Improvement of the mechanical properties of glass-based materials, in particular with respect to damage resistance and fracture toughness, is an ongoing focus. Accordingly, there is a need to provide materials with improved damage resistance and fracture toughness.

Lithium-containing aluminosilicate glass-ceramic articles in the β-spodumene family that are ion-exchangeable are known that provide damage resistance and fracture toughness. However, β-spodumene based glass-ceramics are generally opaque, which constrains them from display-related or other applications requiring transparency or translucency. Thus, there is a need for a transparent or translucent glass-ceramic material with fast ion-exchanging capability and high fracture toughness.

BRIEF SUMMARY

A first aspect comprises a glass-ceramic article having a petalite crystalline phase and a lithium silicate crystalline phase, wherein the petalite crystalline phase and the lithium silicate crystalline phase have higher weight percentages than other crystalline phases present in the glass-ceramic article. In some embodiments, the petalite crystalline phase comprises 20 to 70 wt % of the glass-ceramic article and the lithium silicate crystalline phase comprises 20 to 60 wt % of the glass ceramic article. In some embodiments, the petalite crystalline phase comprises 45 to 70 wt % of the glass-ceramic article and the lithium silicate crystalline phase comprises 20 to 50 wt % of the glass ceramic article. In some embodiments, the petalite crystalline phase comprises 40 to 60 wt % of the glass-ceramic article and the lithium silicate crystalline phase comprises 20 to 50 wt % of the glass ceramic article.

In some embodiments, the glass-ceramic article is transparent. In some embodiments, the glass-ceramic article has a transmittance of at least 85% for light in a wavelength range from 400 nm to 1,000 nm. In some embodiments, the glass-ceramic article has a transmittance of at least 90% for light in a wavelength range from 400 nm to 1,000 nm. In some embodiments, the glass-ceramic article is transparent. In some embodiments, the glass-ceramic article comprises grains having a longest dimension of 500 nm or less or alternatively 100 nm or less.

In some embodiments, the glass-ceramic has a composition comprising, in wt %:
$SiO_2$: 55-80%;
$Al_2O_3$: 2-20%;
$Li_2O$: 5-20%;
$B_2O_3$: 0-10%;
$Na_2O$: 0-5%;
$ZnO$: 0-10%;
$P_2O_5$: 0.5-6%; and
$ZrO_2$: 0.2-15%.

In some embodiments, the glass-ceramic article has a composition further comprising, in wt % the following optional additional components:
$K_2O$: 0-4%;
$MgO$: 0-8%;
$TiO_2$: 0-5%;
$CeO_2$: 0-0.4% and
$SnO_2$: 0.05-0.5%.

In some embodiments, the glass-ceramic article has a composition comprising, in wt %:
$SiO_2$: 69-80%;
$Al_2O_3$: 6-9%;
$Li_2O$: 10-14%;
$B_2O_3$: 0-2%;
$P_2O_5$: 1.5-2.5%; and
$ZrO_2$: 2-4%.

In some embodiments, the glass-ceramic article has a composition comprising, in wt %:
$SiO_2$: 69-80%;
$Al_2O_3$: 6-9%;

Li$_2$O: 10-14%;
Na$_2$O: 1-2%;
K$_2$O: 1-2%;
B$_2$O$_3$: 0-12%;
P$_2$O$_5$: 1.5-2.5%; and
ZrO$_2$: 2-4%.

In some embodiments, the glass-ceramic article has a composition comprising, in wt %:
SiO$_2$: 65-80%;
Al$_2$O$_3$: 5-16%;
Li$_2$O: 8-15%;
Na$_2$O: 0-3%;
K$_2$O: 0-3%;
B$_2$O$_3$: 0-6%;
ZnO: 0-2%;
P$_2$O$_5$: 0.5-4%; and
ZrO$_2$: 0.2-6%.

In some embodiments, the glass-ceramic article has a composition comprising, in wt %:
SiO$_2$: 60-80%;
Al$_2$O$_3$: 5-20%;
Li$_2$O: 5-20%;
Na$_2$O: 0-3%;
K$_2$O: 0-3%;
B$_2$O$_3$: 0-6%;
ZnO: 0-4%;
P$_2$O$_5$: 0.5-4%; and
ZrO$_2$: 0.2-8%.

In some embodiments, a sum of the weight percentage of P$_2$O$_5$ and ZrO$_2$ in the glass-ceramic composition is greater than 3.

In some embodiments, the glass-ceramic article has one or more of the following: a fracture toughness of 1 MPa·m$^{1/2}$ or greater, a Vickers hardness of about 600 kgf/mm$^2$ or greater, or a ring-on-ring strength of at least 300 MPa. In some embodiments, the glass-ceramic article has a compressive stress layer formed by ion-exchange having a depth of layer (DOL) of at least about 30 µm. In some embodiments, the ion-exchanged glass-ceramic article is not frangible.

A second aspect comprises a method of forming a glass-ceramic article, the method comprises forming a glass composition comprising, in wt %:
SiO$_2$: 55-80%;
Al$_2$O$_3$: 2-20%;
Li$_2$O: 5-20%;
B$_2$O$_3$: 0-10%;
Na$_2$O: 0-5%;
ZnO: 0-10%;
P$_2$O$_5$: 0.5-6%; and
ZrO$_2$: 0.2 2-15%; and
ceramming the glass composition to form a glass-ceramic article comprising a petalite crystalline phase and a lithium silicate crystalline phase, wherein the petalite crystalline phase and the lithium silicate crystalline phase have higher weight percentages than other crystalline phases present in the glass-ceramic article.

In some embodiments the method comprises forming a glass composition further comprising, in wt %:
K$_2$O: 0-4%;
MgO: 0-8%;
TiO$_2$: 0-5%;
CeO$_2$: 0-0.4% and
SnO$_2$: 0.05-0.5%.

In some embodiments, the method comprises forming a glass composition that comprises, in wt %:
SiO$_2$: 69-80%;
Al$_2$O$_3$: 6-9%;
Li$_2$O: 10-14%;
B$_2$O$_3$: 0-2%;
P$_2$O$_5$: 1.5-2.5%; and
ZrO$_2$: 2-4%.

In some embodiments, the method comprises forming a glass composition that comprises, in wt %:
SiO$_2$: 69-80%;
Al$_2$O$_3$: 6-9%;
Li$_2$O: 10-14%;
Na$_2$O: 1-2%;
K$_2$O: 1-2%;
B$_2$O$_3$: 0-12%;
P$_2$O$_5$: 1.5-2.5%; and
ZrO$_2$: 2-4%.

In some embodiments, the method comprises forming a glass composition that comprises, in wt %:
SiO$_2$: 65-80%;
Al$_2$O$_3$: 5-16%;
Li$_2$O: 8-15%;
Na$_2$O: 0-3%;
K$_2$O: 0-3%;
B$_2$O$_3$: 0-6%;
ZnO: 0-2%;
P$_2$O$_5$: 0.5-4%; and
ZrO$_2$: 0.2-6%.

In some embodiments, the method comprises forming a glass composition that comprises, in wt %:
SiO$_2$: 60-80%;
Al$_2$O$_3$: 5-20%;
Li$_2$O: 5-20%;
Na$_2$O: 0-3%;
K$_2$O: 0-3%;
B$_2$O$_3$: 0-6%;
ZnO: 0-4%;
P$_2$O$_5$: 0.5-4%; and
ZrO$_2$: 0.2-8%.

In some embodiments, a sum of the weight percentage of P$_2$O$_5$ and ZrO$_2$ in the glass composition is greater than 3.

In some embodiments, the method further comprises ion-exchanging the glass-ceramic article to create a compressive stress layer having a depth of layer of at least 30 µm. In some embodiments, the ion-exchanged glass-ceramic article is not frangible.

In some embodiments, ceramming comprises the sequential steps of: heating the glass composition to a glass pre-nucleation temperature; maintaining the glass pre-nucleation temperature for a predetermined period of time; heating the composition to a nucleation temperature; maintaining the nucleation temperature for a predetermined period of time; heating the composition to a crystallization temperature; and maintaining the crystallization temperature for a predetermined period of time.

In some embodiments, ceramming comprises the sequential steps of: heating the composition to a nucleation temperature; maintaining the nucleation temperature for a predetermined period of time; heating the composition to a crystallization temperature; and maintaining the crystallization temperature for a predetermined period of time.

In some embodiments, the method forms a glass-ceramic article wherein the petalite crystalline phase comprises 20 to 70 wt % of the glass-ceramic article and the lithium silicate crystalline phase comprises 20 to 60 wt % of the glass ceramic article.

These and other aspects, advantages, and salient features will become apparent from the following detailed description, the accompanying drawings, and the appended claims.

FIGURES

DETAILED DESCRIPTION

Figure 1:
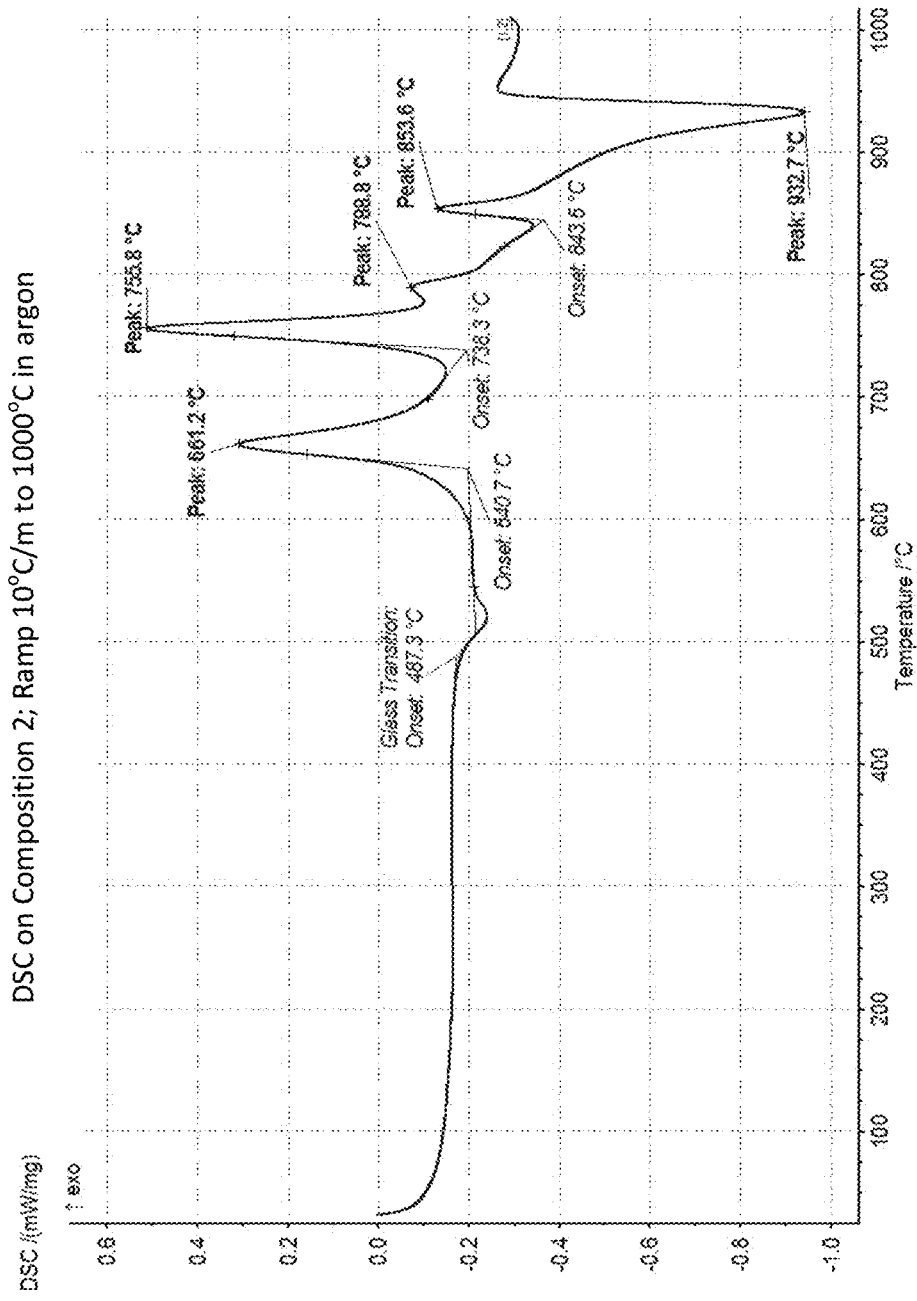
FIG. 1 is a plot of a differential calorimetry (DSC) trace for an exemplary glass-ceramic composition.

In the following detailed description, numerous specific details may be set forth in order to provide a thorough understanding of embodiments described herein. However, it will be clear to one skilled in the art when embodiments may be practiced without some or all of these specific details. In other instances, well-known features or processes may not be described in detail so as not to unnecessarily obscure the disclosure. In addition, like or identical reference numerals may be used to identify common or similar elements. Moreover, unless otherwise defined, all technical and scientific terms used herein have the same meaning as commonly understood by one of ordinary skill in the art to which this disclosure belongs. In case of conflict, the present specification, including the definitions herein, will control.

Although other methods and materials can be used in the practice or testing of the embodiments, certain suitable methods and materials are described herein.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. More specifically, the example composition ranges given herein are considered part of the specification and further, are considered to provide example numerical range endpoints, equivalent in all respects to their specific inclusion in the text, and all combinations are specifically contemplated and disclosed. Further, if there are a variety of additional steps that can be performed it is understood that each of these additional steps can be performed with any specific embodiment or combination of embodiments of the disclosed methods, and that each such combination is specifically contemplated and should be considered disclosed.

Moreover, where a range of numerical values is recited herein, comprising upper and lower values, unless otherwise stated in specific circumstances, the range is intended to include the endpoints thereof, and all integers and fractions within the range. It is not intended that the scope of the disclosure be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B." Exclusive "or" is designated herein by terms such as "either A or B" and "one of A or B," for example.

The indefinite articles "a" and "an" are employed to describe elements and components of the disclosure. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

For the purposes of describing the embodiments, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that terms like "preferably," "commonly," and "typically," when utilized herein, are not utilized to limit the scope of the disclosure or to imply that certain features are critical, essential, or even important to the structure or function of the disclosure. Rather, these terms are merely intended to identify particular aspects of an embodiment of the present disclosure or to emphasize alternative or additional features that may or may not be utilized in a particular embodiment of the present disclosure.

It is noted that one or more of the claims may utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

As a result of the raw materials and/or equipment used to produce the glass or glass ceramic composition of the present disclosure, certain impurities or components that are not intentionally added, can be present in the final glass or glass ceramic composition. Such materials are present in the glass or glass ceramic composition in minor amounts and are referred to herein as "tramp materials."

As used herein, a glass or glass ceramic composition having 0 wt % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts.

Unless otherwise specified, the concentrations of all constituents recited herein are expressed in terms of weight percent (wt %).

Glasses and Glass Ceramics

As noted previously, it is desirable to obtain a transparent or translucent lithium-containing aluminosilicate glass ceramic composition that has petalite and lithium silicate as the primary crystal phases. The lithium silicate crystal phase may be lithium disilicate or lithium metasilicate. Improved properties of the glass and glass ceramic compositions disclosed herein include: 1) the glass retains a low melting temperature (below 1500° C.), yet provides a higher liquidus viscosity (>2000 poise) and a long working range that is compatible with conventional rolling, molding, and float processes; 2) lithium silicate is retained as a major crystal phase, providing inherently high mechanical strength and fracture toughness to the glass-ceramic; and 3) petalite is a second major crystal phase and has a fine grain size, which contributes to the transparency or translucency of the glass-ceramic, and also can be ion-exchanged for additional mechanical strength. Additionally, the materials can be cerammed into shapes with minimal deformation, readily machined to precision shapes, cut, drilled, chamfered, tapped, polished to high luster with conventional ceramic machining tooling and even exhibit various degrees of translucency depending on composition and heat treatment. These properties make the glass ceramics useful for a broad number of applications, such as countertops and other surfaces, hand-held, desk-top, and wall-mounted consumer electronic device coverings, appliance doors and exteriors, floor tiles, wall panels, ceiling tiles, white boards, materials storage containers (holloware) such as beverage bottles, food sales and storage vessels, machine parts requiring light weight, good wear resistance and precise dimensions. The glass ceramics can be formed in three-dimensional articles using various methods due to its lower viscosity.

Petalite, $LiAlSi_4O_{10}$, is a monoclinic crystal possessing a three-dimensional framework structure with a layered structure having folded $Si_2O_5$ layers linked by Li and Al tetrahedra. The Li is in tetrahedral coordination with oxygen. The mineral petalite is a lithium source and is used as a low thermal expansion phase to improve the thermal downshock resistance of glass-ceramic or ceramic parts. Moreover, glass-ceramic articles based on the petalite phase can be chemically strengthened in a salt bath, during which $Na^+$ (and/or $K^+$) replaces $Li^+$ in the petalite structure, which causes surface compression and strengthening. In some embodiments, the weight percentage of the petalite crystalline phase in the glass-ceramic compositions can be in a range from about 20 to about 70 wt %, about 20 to about 65 wt %, about 20 to about 60 wt %, about 20 to about 55 wt %, about 20 to about 50 wt %, about 20 to about 45 wt %, about 20 to about 40 wt %, about 20 to about 35 wt %, about 20 to about 30 wt %, about 20 to about 25 wt %, about 25 to about 70 wt %, about 25 to about 65 wt %, about 25 to about 60 wt %, about 25 to about 55 wt %, about 25 to about 50 wt %, about 25 to about 45 wt %, about 25 to about 40 wt %, about 25 to about 35 wt %, about 25 to about 30 wt %, about 30 to about 70 wt %, about 30 to about 65 wt %, about 30 to about 60 wt %, about 30 to about 55 wt %, about 30 to about 50 wt %, about 30 to about 45 wt %, about 30 to about 40 wt %, about 30 to about 35 wt %, about 35 to about 70 wt %, about 35 to about 65 wt %, about 35 to about 60 wt %, about 35 to about 55 wt %, about 35 to about 50 wt %, about 35 to about 45 wt %, about 35 to about 40 wt %, about 40 to about 70 wt %, about 40 to about 65 wt %, about 40 to about 60 wt %, about 40 to about 55 wt %, about 40 to about 50 wt %, about 40 to about 45 wt %, about 45 to about 70 wt %, about 45 to about 65 wt %, about 45 to about 60 wt %, about 45 to about 55 wt %, about 45 to about 50 wt %, about 50 to about 70 wt %, about 50 to about 65 wt %, about 50 to about 60 wt %, about 50 to about 55 wt %, about 55 to about 70 wt %, about 55 to about 65 wt %, about 55 to about 60 wt %, about 60 to about 70 wt %, about 60 to about 65 wt %, or about 65 to about 70 wt %. In some embodiments, the glass-ceramic has about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt % petalite crystalline phase.

As noted above, the lithium silicate crystalline phase may be lithium disilicate or lithium metasilicate. Lithium disilicate, $Li_2Si_2O_5$, is an orthorhombic crystal based on corrugated sheets of {Si$_2$O$_5$} tetrahedral arrays. The crystals are typically tabular or lath-like in shape, with pronounced cleavage planes. Glass-ceramics based on lithium disilicate offer highly desirable mechanical properties, including high body strength and fracture toughness, due to their microstructures of randomly-oriented interlocked crystals—a crystal structure that forces cracks to propagate through the material via tortuous paths around these crystals. Lithium metasilicate, Li$_2$SiO$_3$, has an orthorhombic symmetry with (Si$_2$O$_6$) chains running parallel to the c axis and linked together by lithium ions. Lithium metasilicate crystals can be easily dissolved from glass-ceramics in diluted hydrofluoric acid. In some embodiments, the weight percentage of the lithium silicate crystalline phase in the glass-ceramic compositions can be in a range from about 20 to about 60 wt %, about 20 to about 55 wt %, about 20 to about 50 wt %, about 20 to about 45 wt %, about 20 to about 40 wt %, about 20 to about 35 wt %, about 20 to about 30 wt %, about 20 to about 25 wt %, about 25 to about 60 wt %, about 25 to about 55 wt %, about 25 to about 50 wt %, about 25 to about 45 wt %, about 25 to about 40 wt %, about 25 to about 35 wt %, about 25 to about 30 wt %, about 30 to about 60 wt %, about 30 to about 55 wt %, about 30 to about 50 wt %, about 30 to about 45 wt %, about 30 to about 40 wt %, about 30 to about 35 wt %, about 35 to about 60 wt %, about 35 to about 55 wt %, about 35 to about 50 wt %, about 35 to about 45 wt %, about 35 to about 40 wt %, about 40 to about 60 wt %, about 40 to about 55 wt %, about 40 to about 50 wt %, about 40 to about 45 wt %, about 45 to about 60 wt %, about 45 to about 55 wt %, about 45 to about 50 wt %, about 50 to about 60 wt %, about 50 to about 55 wt %, or about 55 to about 60 wt %. In some embodiments, the glass-ceramic has 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt % lithium silicate crystalline phase.

There are two broad families of lithium disilicate glass-ceramics. The first group comprises those that are doped with ceria and a noble metal such as silver. These can be photosensitively nucleated via UV light and subsequently heat-treated to produce strong glass-ceramics such as Fotoceram®. The second family of lithium disilicate glass-ceramics is nucleated by the addition of P$_2$O$_5$, wherein the nucleating phase is Li$_3$PO$_4$. P$_2$O$_5$-nucleated lithium disilicate glass-ceramics have been developed for applications as varied as high-temperature sealing materials, disks for computer hard drives, transparent armor, and dental applications.

The glasses and glass ceramics described herein may be generically described as lithium-containing aluminosilicate glasses or glass ceramics and comprise SiO$_2$, Al$_2$O$_3$, and Li$_2$O. In addition to SiO$_2$, Al$_2$O$_3$, and Li$_2$O, the glasses and glass ceramics embodied herein may further contain alkali salts, such as Na$_2$O, K$_2$O, Rb$_2$O, or Cs$_2$O, as well as P$_2$O$_5$, and ZrO$_2$ and a number of other components as described below. In one or more embodiments, the major crystallite phases include petalite and lithium silicate, but β-spodumene ss, β-quartz ss, lithium phosphate, cristobalite, and rutile may also be present as minor phases depending on the compositions of the precursor glass. In some embodiments, the glass-ceramic composition has a residual glass content of about 5 to about 30 wt %, about 5 to about 25 wt %, about 5 to about 20 wt %, about 5 to about 15 wt % about 5 to about 10 wt %, about 10 to about 30 wt %, about 10 to about 25 wt %, about 10 to about 20 wt %, about 10 to about 15 wt %, about 15 to about 30 wt %, about 15 to about 25 wt %, about 15 to about 20 wt %, about 20 to about 30 wt %, about 20 to about 25 wt %, or about 25 to about 30 wt %. In some embodiments the residual glass content can be 5, 6, 7, 8, 9, 10, 11, 12, 13, 14, 15, 16, 17, 18, 19, 20, 21, 22, 23, 24, 25, 26, 27, 28, 29, or 30 wt %.

SiO$_2$, an oxide involved in the formation of glass, can function to stabilize the networking structure of glasses and glass ceramics. In some embodiments, the glass or glass ceramic composition comprises from about 55 to about 80 wt % SiO$_2$. In some embodiments, the glass or glass ceramic composition comprises from 69 to about 80 wt % SiO$_2$. In some embodiments, the glass or glass ceramic composition can comprise from about 55 to about 80 wt %, about 55 to about 77 wt %, about 55 to about 75 wt %, about 55 to about 73 wt %, 60 to about 80 wt %, about 60 to about 77 wt %, about 60 to about 75 wt %, about 60 to about 73 wt %, 65 to about 80 wt %, about 65 to about 77 wt %, about 65 to about 75 wt %, about 65 to about 73 wt %, 69 to about 80 wt %, about 69 to about 77 wt %, about 69 to about 75 wt %, about 69 to about 73 wt %, about 70 to about 80 wt %, about 70 to about 77 wt %, about 70 to about 75 wt %, about 70 to about 73 wt %, about 73 to about 80 wt %, about 73 to about 77 wt %, about 73 to about 75 wt %, about 75 to about 80 wt %, about 75 to about 77 wt %, or about 77 to about 80 wt %, SiO$_2$. In some embodiments, the glass or glass ceramic composition comprises about 55, 56, 57, 58, 59, 60, 61, 62, 63, 64, 65, 66, 67, 68, 69, 70, 71, 72, 73, 74, 75, 76, 77, 78, 79, or 80, wt % SiO$_2$.

With respect to viscosity and mechanical performance, the viscosity and mechanical performance are influenced by glass compositions. In the glasses and glass ceramics, SiO$_2$ serves as the primary glass-forming oxide for the precursor glass and can function to stabilize the networking structure of glass and glass ceramic. The concentration of SiO$_2$ should be sufficiently high in order to form petalite crystal phase when the precursor glass is heat treated to convert to a glass-ceramic. The amount of SiO$_2$ may be limited to control melting temperature (200 poise temperature), as the melting temperature of pure SiO$_2$ or high-SiO$_2$ glasses is undesirably high.

Al$_2$O$_3$ may also provide stabilization to the network and also provides improved mechanical properties and chemical durability. If the amount of Al$_2$O$_3$ is too high, however, the fraction of lithium silicate crystals may be decreased, possibly to the extent that an interlocking structure cannot be formed. The amount of Al$_2$O$_3$ can be tailored to control viscosity. Further, if the amount of Al$_2$O$_3$ is too high, the viscosity of the melt is also generally increased. In some embodiments, the glass or glass ceramic composition can comprise from about 2 to about 20 wt % Al$_2$O$_3$. In some embodiments, the glass or glass ceramic composition can comprise from about 6 to about 9 wt % Al$_2$O$_3$. In some embodiments, the glass or glass ceramic composition can comprise from about 2 to about 20%, about 2 to about 18 wt %, about 2 to about 15 wt %, about 2 to about 12 wt %, about 2 to about 10 wt %, about 2 to about 9 wt %, about 2 to about 8 wt %, about 2 to about 5 wt %, about 5 to about 20%, about 5 to about 18 wt %, about 5 to about 15 wt %, about 5 to about 12 wt %, about 5 to about 10 wt %, about 5 to about 9 wt %, about 5 to about 8 wt %, about 6 to about 20%, about 6 to about 18 wt %, about 6 to about 15 wt %, about 6 to about 12 wt %, about 6 to about 10 wt %, about 6 to about 9 wt %, about 8 to about 20%, about 8 to about 18 wt %, about 8 to about 15 wt %, about 8 to about 12 wt %, about 8 to about 10 wt %, about 10 to about 20%, about 10 to about 18 wt %, about 10 to about 15 wt %, about 10 to about 12 wt %, about 12 to about 20%, about 12 to about 18 wt %, or about 12 to about 15 wt %, Al$_2$O$_3$. In some embodiments, the glass or glass ceramic composition can comprise about 2, 3, 4, 5, 6, 7, 8, 9, 10, 11, 12, 13, 14, 15, 16, 17, 18, 19, or 20 wt % $Al_2O_3$.

In the glass and glass ceramics herein, $Li_2O$ aids in forming both petalite and lithium silicate crystal phases. In fact, to obtain petalite and lithium silicate as the predominant crystal phases, it is desirable to have at least about 7 wt % $Li_2O$ in the composition. Additionally, it has been found that once $Li_2O$ gets too high—greater than about 15 wt %—the composition becomes very fluid. In some embodied compositions, the glass or glass ceramic can comprise from about 5 wt % to about 20 wt % $Li_2O$. In other embodiments, the glass or glass ceramic can comprise from about 10 wt % to about 14 wt % $Li_2O$. In some embodiments, the glass or glass ceramic composition can comprise from about 5 to about 20 wt %, about 5 to about 18 wt %, about 5 to about 16 wt %, about 5 to about 14 wt %, about 5 to about 12 wt %, about 5 to about 10 wt %, about 5 to about 8 wt %, 7 to about 20 wt %, about 7 to about 18 wt %, about 7 to about 16 wt %, about 7 to about 14 wt %, about 7 to about 12 wt %, about 7 to about 10 wt %, 10 to about 20 wt %, about 10 to about 18 wt %, about 10 to about 16 wt %, about 10 to about 14 wt %, about 10 to about 12 wt %, 12 to about 20 wt %, 12 to about 18 wt %, about 12 to about 16 wt %, about 12 to about 14 wt %, 14 to about 20 wt %, about 14 to about 18 wt %, about 14 to about 16 wt %, about 16 to about 20 wt %, about 16 to about 18 wt %, or about 18 to about 20 wt % $Li_2O$. In some embodiments, the glass or glass ceramic composition can comprise about 5, 6, 7, 8, 9, 10, 11, 12, 13, 14, 15, 16, 17, 18, 19, or 20 wt % $Li_2O$.

As noted above, $Li_2O$ is generally useful for forming the embodied glass ceramics, but the other alkali oxides tend to decrease glass ceramic formation and form an aluminosilicate residual glass in the glass-ceramic. It has been found that more than about 5 wt % $Na_2O$ or $K_2O$, or combinations thereof, leads to an undesirable amount of residual glass which can lead to deformation during crystallization and undesirable microstructures from a mechanical property perspective. The composition of the residual glass may be tailored to control viscosity during crystallization, minimizing deformation or undesirable thermal expansion, or control microstructure properties. Therefore, in general, the compositions described herein have low amounts of non-lithium alkali oxides. In some embodiments, the glass or glass ceramic composition can comprise from about 0 to about 5 wt % $R_2O$, wherein R is one or more of the alkali cations Na and K. In some embodiments, the glass or glass ceramic composition can comprise from about 1 to about 3 wt % $R_2O$, wherein R is one or more of the alkali cations Na and K. In some embodiments, the glass or glass ceramic composition can comprise from 0 to about 5 wt %, 0 to 4 wt %, 0 to 3 wt %, 0 to about 2 wt %, 0 to about 1 wt %, >0 to about 5 wt %, >0 to about 4 wt %, >0 to about 3 wt %, >0 to about 2 wt %, >0 to about 1 wt %, about 1 to about 5 wt %, about 1 to about 4 wt %, about 1 to about 3 wt %, about 1 to about 2 wt %, about 2 to about 5 wt %, about 2 to about 4 wt %, about 2 to about 3 wt %, about 3 to about 5 wt %, about 3 to about 4 wt %, or about 4 to about 5 wt % $Na_2O$ or $K_2O$, or combinations thereof. In some embodiments, the glass or glass ceramic composition can comprise about 0, >0, 1, 2, 3, 4, or 5 wt % $R_2O$.

The glass and glass ceramic compositions can include $P_2O_5$. $P_2O_5$ can function as a nucleating agent to produce bulk nucleation. If the concentration of $P_2O_5$ is too low, the precursor glass does crystallize, but only at higher temperatures (due to a lower viscosity) and from the surface inward, yielding a weak and often deformed body; however, if the concentration of $P_2O_5$ is too high, the devitrification, upon cooling during precursor glass forming, can be difficult to control. Embodiments can comprise from >0 to about 6 wt % $P_2O_5$. Other embodiments can comprise about 2 to about 4 wt % $P_2O_5$. Still other embodiments can comprise about 1.5 to about 2.5 wt % $P_2O_5$. Embodied compositions can comprise from 0 to about 6 wt %, 0 to about 5.5 wt %, 0 to about 5 wt %, 0 to about 4.5 wt %, 0 to about 4 wt %, 0 to about 3.5 wt %, 0 to about 3 wt %, 0 to about 2.5 wt %, 0 to about 2 wt %, 0 to about 1.5 wt %, 0 to about 1 wt %, >0 to about 6 wt %, >0 to about 5.5 wt %, >0 to about 5 wt %, >0 to about 4.5 wt %, >0 to about 4 wt %, >0 to about 3.5 wt %, >0 to about 3 wt %, >0 to about 2.5 wt %, >0 to about 2 wt %, >0 to about 1.5 wt %, >0 to about 1 wt %, about 0.5 to about 6 wt %, about 0.5 to about 5.5 wt %, about 0.5 to about 5 wt %, about 0.5 to about 4.5 wt %, about 0.5 to about 4 wt %, about 0.5 to about 3.5 wt, about 0.5 to about 3 wt %, about 0.5 to about 2.5 wt %, about 0.5 to about 2 wt %, about 0.5 to about 1.5 wt %, about 0.5 to about 1 wt %, about 1 to about 6 wt %, about 1 to about 5.5 wt %, about 1 to about 5 wt %, about 1 to about 4.5 wt %, about 1 to about 4 wt %, about 1 to about 3.5 wt %, about 1 to about 3 wt %, about 1 to about 2.5 wt %, about 1 to about 2 wt %, about 1 to about 1.5 wt %, about 1.5 to about 6 wt %, about 1.5 to about 5.5 wt %, about 1.5 to about 5 wt %, about 1.5 to about 4.5 wt %, about 1.5 to about 4 wt %, about 1.5 to about 3.5 wt %, about 1.5 to about 3 wt %, about 1.5 to about 2.5 wt %, about 1.5 to about 2 wt %, about 2 to about 6 wt %, about 2 to about 5.5 wt %, about 2 to about 5 wt %, about 2 to about 4.5 wt %, about 2 to about 4 wt %, about 2 to about 3.5 wt %, about 2 to about 3 wt %, about 2 to about 2.5 wt %, about 2.5 to about 6 wt %, about 2.5 to about 5.5 wt %, about 2.5 to about 5 wt %, about 2.5 to about 4.5 wt %, about 2.5 to about 4 wt %, about 2.5 to about 3.5 wt %, about 2.5 to about 3 wt %, about 3 to about 6 wt %, about 3 to about 5.5 wt %, about 3 to about 5 wt %, about 3 to about 4.5 wt %, about 3 to about 4 wt %, about 3 to about 3.5 wt %, about 3.5 to about 6 wt %, about 3.5 to about 5.5 wt %, about 3.5 to about 5 wt %, about 3.5 to about 4.5 wt %, about 3.5 to about 4 wt %, about 4 to about 6 wt %, about 4 to about 5.5 wt %, about 4 to about 5 wt %, about 4 to about 4.5 wt %, about 4.5 to about 6 wt %, about 4.5 to about 5.5 wt %, about 4.5 to about 5 wt %, about 5 to about 6 wt %, about 5 to about 5.5 wt %, or about 5.5 to about 6 wt % $P_2O_5$. In some embodiments, the glass or glass ceramic composition can comprise about 0, >0, 0.5, 1, 1.5, 2, 2.5, 3, 3.5, 4, 4.5, 5, 5.5, or 6 wt % $P_2O_5$.

In the glass and glass ceramics herein, it is generally found that $ZrO_2$ can improve the stability of $Li_2O$—$Al_2O_3$—$SiO_2$—$P_2O_5$ glass by significantly reducing glass devitrification during forming and lowering liquidus temperature. At concentrations above 8 wt %, $ZrSiO_4$ can form a primary liquidus phase at a high temperature, which significantly lowers liquidus viscosity. Transparent glasses can be formed when the glass contains over 2 wt % $ZrO_2$. The addition of $ZrO_2$ can also help decrease the petalite grain size, which aids in the formation of a transparent glass-ceramic. In some embodiments, the glass or glass ceramic composition can comprise from about 0.2 to about 15 wt % $ZrO_2$. In some embodiments, the glass or glass ceramic composition can be from about 2 to about 4 wt % $ZrO_2$. In some embodiments, the glass or glass ceramic composition can comprise from about 0.2 to about 15 wt %, about 0.2 to about 12 wt %, about 0.2 to about 10 wt %, about 0.2 to about 8 wt %, about 0.2 to 6 wt %, about 0.2 to about 4 wt %, 0.5 to about 15 wt %, about 0.5 to about 12 wt %, about 0.5 to about 10 wt %, about 0.5 to about 8 wt %, about 0.5 to 6 wt %, about 0.5 to about 4 wt %, 1 to about 15 wt %, about 1 to about 12 wt %, about 1 to about 10 wt %, about 1 to about 8 wt %, about 1 to 6 wt %, about 1 to about 4 wt %, 2 to about 15 wt %, about 2 to about 12 wt %, about 2 to about 10 wt %, about 2 to about 8 wt %, about 2 to 6 wt %, about 2 to about 4 wt %, about 3 to about 15 wt %, about 3 to about 12 wt %, about 3 to about 10 wt %, about 3 to about 8 wt %, about 3 to 6 wt %, about 3 to about 4 wt %, about 4 to about 15 wt %, about 4 to about 12 wt %, about 4 to about 10 wt %, about 4 to about 8 wt %, about 4 to 6 wt %, about 8 to about 15 wt %, about 8 to about 12 wt %, about 8 to about 10 wt %, about 10 to about 15 wt %, about 10 to about 12 wt %, or about 12 to about 15 wt % $ZrO_2$. In some embodiments, the glass or glass ceramic composition can comprise about 0.2, 0.5, 1, 2, 3, 4, 5, 6, 7, 8, 9, 10, 11, 12, 13, 14, or 15 wt % $ZrO_2$.

$B_2O_3$ is conducive to providing a precursor glass with a low melting temperature. Furthermore, the addition of $B_2O_3$ in the precursor glass and thus the glass-ceramics helps achieve an interlocking crystal microstructure and can also improve the damage resistance of the glass ceramic. When boron in the residual glass is not charge balanced by alkali oxides or divalent cation oxides, it will be in trigonal-coordination state (or three-coordinated boron), which opens up the structure of the glass. The network around these three-coordinated boron is not as rigid as tetrahedrally coordinated (or four-coordinated) boron. Without being bound by theory, it is believed that precursor glasses and glass ceramics that include three-coordinated boron can tolerate some degree of deformation before crack formation. By tolerating some deformation, the Vickers indentation crack initiation values are increased. Fracture toughness of the precursor glasses and glass ceramics that include three-coordinated boron may also be increased. Without being bound by theory, it is believed that the presence of boron in the residual glass of the glass ceramic (and precursor glass) lowers the viscosity of the residual glass (or precursor glass), which facilitates the growth of lithium silicate crystals, especially large crystals having a high aspect ratio. A greater amount of three-coordinated boron (in relation to four-coordinated boron) is believed to result in glass ceramics that exhibit a greater Vickers indentation crack initiation load. In some embodiments, the amount of three-coordinated boron (as a percent of total $B_2O_3$) may be about 40% or greater, 50% or greater, 75% or greater, about 85% or greater or even about 95% or greater. The amount of boron in general should be controlled to maintain chemical durability and mechanical strength of the cerammed bulk glass ceramic.

In one or more embodiments, the glasses and glass ceramic herein can comprise from 0 to about 10 wt % or from 0 to about 2 wt % $B_2O_3$. In some embodiments, the glass or glass ceramic composition can comprise from 0 to about 10 wt %, 0 to about 9 wt %, 0 to about 8 wt %, 0 to about 7 wt %, 0 to about 6 wt %, 0 to about 5 wt %, 0 to about 4 wt %, 0 0 to about 3 wt %, 0 to about 2 wt %, 0 to about 1 wt %, >0 to about 10 wt %, >0 to about 9 wt %, >0 to about 8 wt %, >0 to about 7 wt %, >0 to about 6 wt %, >0 to about 5 wt %, >0 to about 4 wt %, >0 to about 3 wt %, >0 to about 2 wt %, >0 to about 1 wt %, about 1 to about 10 wt %, about 1 to about 8 wt %, about 1 to about 6 wt %, about 1 to about 5 wt %, about 1 to about 4 wt %, about 1 to about 2 wt %, about 2 to about 10 wt %, about 2 to about 8 wt %, about 2 to about 6 wt %, about 2 to about 4 wt %, about 3 to about 10 wt %, about 3 to about 8 wt %, about 3 to about 6 wt %, about 3 to about 4 wt %, about 4 to about 5 wt %, about 5 wt % to about 8 wt %, about 5 wt % to about 7.5 wt %, about 5 wt % to about 6 wt %, or about 5 wt % to about 5.5 wt % $B_2O_3$. In some embodiments, the glass or glass ceramic composition can comprise about 0, >0, 1, 2, 3, 4, 5, 6, 7, 8, 9, or 10 wt % $B_2O_3$.

MgO can enter petalite crystals in a partial solid solution. In one or more embodiments, the glasses and glass ceramic herein can comprise from 0 to about 8 wt % MgO. In some embodiments, the glass or glass ceramic composition can comprise from 0 to about 8 wt %, 0 to about 7 wt %, 0 to about 6 wt %, 0 to about 5 wt %, 0 to about 4 wt %, 0 to about 3 wt %, 0 to about 2 wt %, 0 to about 1 wt %, about 1 to about 8 wt %, about 1 to about 7 wt %, about 1 to about 6 wt %, about 1 to about 5 wt %, about 1 to about 4 wt %, about 1 to about 3 wt %, about 1 to about 2 wt %, about 2 to about 8 wt %, about 2 to about 7 wt %, about 2 to about 6 wt %, about 2 to about 5 wt %, about 2 to about 4 wt %, about 2 to about 3 wt %, about 3 to about 8 wt %, about 3 to about 7 wt %, about 3 to about 6 wt %, about 3 to about 5 wt %, about 3 to about 4 wt %, about 4 to about 8 wt %, about 4 to about 7 wt %, about 4 to about 6 wt %, about 4 to about 5 wt %, about 5 to about 8 wt %, about 5 to about 7 wt %, about 5 to about 6 wt %, about 6 to about 8 wt %, about 6 to about 7 wt %, or about 7 wt % to about 8 wt % MgO. In some embodiments, the glass or glass ceramic composition can comprise about 0, >0, 1, 2, 3, 4, 5, 6, 7, or 8 wt % MgO.

ZnO can enter petalite crystals in a partial solid solution. In one or more embodiments, the glasses and glass ceramics herein can comprise from 0 to about 10 wt % ZnO. In some embodiments, the glass or glass ceramic composition can comprise from 0 to about 10 wt %, 0 to about 9 wt %, 0 to about 8 wt %, 0 to about 7 wt %, 0 to about 6 wt %, 0 to about 5 wt %, 0 to about 4 wt %, 0 to about 3 wt %, 0 to about 2 wt %, 0 to about 1 wt %, about 1 to about 10 wt %, about 1 to about 9 wt %, about 1 to about 8 wt %, about 1 to about 7 wt %, about 1 to about 6 wt %, about 1 to about 5 wt %, about 1 to about 4 wt %, about 1 to about 3 wt %, about 1 to about 2 wt %, about 2 to about 10 wt %, about 2 to about 9 wt %, about 2 to about 8 wt %, about 2 to about 7 wt %, about 2 to about 6 wt %, about 2 to about 5 wt %, about 2 to about 4 wt %, about 2 to about 3 wt %, about 3 to about 10 wt %, about 3 to about 9 wt %, about 3 to about 8 wt %, about 3 to about 7 wt %, about 3 to about 6 wt %, about 3 to about 5 wt %, about 3 to about 4 wt %, about 4 to about 10 wt %, about 4 to about 9 wt %, about 4 to about 8 wt %, about 4 to about 7 wt %, about 4 to about 6 wt %, about 4 to about 5 wt %, about 5 to about 10 wt %, about 5 to about 9 wt %, about 5 to about 8 wt %, about 5 to about 7 wt %, about 5 to about 6 wt %, about 6 to about 10 wt %, about 6 to about 9 wt %, about 6 to about 8 wt %, about 6 to about 7 wt %, about 7 to about 10 wt %, about 7 to about 9 wt %, about 7 wt % to about 8 wt %, about 8 to about 10 wt %, about 8 to about 9 wt %, or about 9 to about 10 wt % ZnO. In some embodiments, the glass or glass ceramic composition can comprise about 0, >0, 1, 2, 3, 4, 5, 6, 7, 8, 9, or 10 wt % ZnO.

In one or more embodiments, the glasses and glass ceramics herein can comprise from 0 to about 5 wt % $TiO_2$. In some embodiments, the glass or glass ceramic composition can comprise from 0 to about 5 wt %, 0 to about 4 wt %, 0 to about 3 wt %, 0 to about 2 wt %, 0 to about 1 wt %, about 1 to about 5 wt %, about 1 to about 4 wt %, about 1 to about 3 wt %, about 1 to about 2 wt %, about 2 to about 5 wt %, about 2 to about 4 wt %, about 2 to about 3 wt %, about 3 to about 5 wt %, about 3 to about 4 wt %, or about 4 to about 5 wt % $TiO_2$. In some embodiments, the glass or glass ceramic composition can comprise about 0, >0, 1, 2, 3, 4, or 5 wt % $TiO_2$.

In one or more embodiments, the glasses and glass ceramics herein can comprise from 0 to about 0.4 wt % $CeO_2$. In some embodiments, the glass or glass ceramic composition can comprise from 0 to about 0.4 wt %, 0 to about 0.3 wt %, 0 to about 0.2 wt %, 0 to about 0.1 wt %, about 0.1 to about 0.4 wt %, about 1 to about 0.3 wt %, about 1 to about 0.2 wt %, about 0.2 to about 0.4 wt %, about 0.2 to about 0.3 wt %, or about 0.3 to about 0.4 wt % $CeO_2$. In some embodiments, the glass or glass ceramic composition can comprise about 0, >0, 0.1, 0.2, 0.3, or 0.4 wt % $CeO_2$.

In one or more embodiments, the glasses and glass ceramics herein can comprise from 0 to about 0.5 wt % $SnO_2$. In some embodiments, the glass or glass ceramic composition can comprise from 0 to about 0.5 wt %, 0 to about 0.4 wt %, 0 to about 0.3 wt %, 0 to about 0.2 wt %, 0 to about 0.1 wt %, about 0.05 to about 0.5 wt %, 0.05 to about 0.4 wt %, 0.05 to about 0.3 wt %, 0.05 to about 0.2 wt %, 0.05 to about 0.1 wt %, about 0.1 to about 0.5 wt %, about 0.1 to about 0.4 wt %, about 0.1 to about 0.3 wt %, about 0.1 to about 0.2 wt %, about 0.2 to about 0.5 wt %, about 0.2 to about 0.4 wt %, about 0.2 to about 0.3 wt %, about 0.3 to about 0.5 wt %, about 0.3 to about 0.4 wt %, or about 0.4 to about 0.5 wt % $SnO_2$. In some embodiments, the glass or glass ceramic composition can comprise about 0, >0, 0.05, 0.1, 0.2, 0.3, 0.4, or 0.5 wt % $SnO_2$.

In some embodiments, the sum of the weight percentage of $P_2O_5$ and $ZrO_2$ in the glasses and glass ceramics disclosed herein can be greater than or equal to about 3 wt %, 4 wt %, or 5 wt % to increase nucleation. An increase in nucleation can lead to the production of finer grains.

In some embodiments, the glass-ceramic exhibits transparency (i.e., the glass-ceramic is transparent) over the visible light range. In some embodiments, transparency of the glass-ceramic can be achieved by producing crystals smaller than the wavelength of the interrogating wavelength of light and by matching the index of refraction of the residual glass with that of petatlite (1.51) and lithium disilicate (1.55). In some embodiments, the a transparent glass-ceramic having a thickness of 1 mm can have a transmittance of >90% of light (including surface reflection losses) over the wavelength range from about 400 nm to about 1,000 nm. In one or more embodiments, the average transmittance for a transparent glass-ceramic article is about 85% or greater, about 86% or greater, about 87% or greater, about 88% or greater, about 89% or greater, about 90% or greater, about 91% or greater, about 92% or greater, about 93% or greater (including surface reflection losses) of light over the wavelength range of about 400 nm to about 1000 nm for a glass-ceramic article having a thickness of 1 mm. In other embodiments, glass-ceramic may be translucent over the visible light range. In some embodiments a translucent glass-ceramic can have an average transmittance in a range from about 20% to less than about 85% of light over the wavelength range of about 400 nm to about 1000 nm for a glass-ceramic article having a thickness of 1 mm In embodiments where the glass-ceramic is translucent, the glass-ceramic can have a white color.

In some embodiments, the size of the grains in the glass-ceramic may affect the transparency or translucency. In some embodiments, the grains of transparent glass-ceramics may have a longest dimension of less than about 100 nm. In some embodiments, the grains of translucent glass-ceramics may have a longest dimension in a range from about 100 nm to about 500 nm. In some embodiments, the grains of transparent glass-ceramics may have an aspect ratio of about 2 or greater. In some embodiments, the grains of translucent glass-ceramics may have an aspect ratio of about 2 or less.

As a result of the raw materials and/or equipment used to produce the glass or glass ceramic composition of the present disclosure, certain impurities or components that are not intentionally added, can be present in the final glass or glass ceramic composition. Such materials are present in the glass or glass ceramic composition in minor amounts and are referred to herein as "tramp materials."

As used herein, a glass or glass ceramic composition having 0 wt % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts. Tramp compounds that may be found in glass or glass ceramic embodied herein include, but are not limited to, $Na_2O$, $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, sulfur-based compounds, such as sulfates, halogens, or combinations thereof.

In some embodiments, antimicrobial components may be added to the glass or glass ceramic composition. This is particularly advantageous as glass ceramics embodied herein can be used in applications such as kitchen or dining countertops where exposure to harmful bacteria is likely. Antimicrobial components that may be added to the glass or glass ceramic include, but are not limited to, Ag, AgO, Cu, CuO, $Cu_2O$, and the like. In some embodiments, the concentrations of the antimicrobial components are kept at a level of about 3, 2, 1, or 0.5, >0 wt %. In some embodiments, the antimicrobial components is from >0 to about 3 wt %. In some embodiments, the antimicrobial components is from >0 to about 1 wt %.

In some embodiments, the glass or glass ceramic may further include a chemical fining agent. Such fining agents include, but are not limited to, $SnO_2$, $As_2O_3$, $Sb_2O_3$, F, Cl and Br. In some embodiments, the concentrations of the chemical fining agents are kept at a level of 3, 2, 1, or 0.5, >0 wt %. In some embodiments, the fining agent amount is from >0 to about 3 wt %. Chemical fining agents may also include $CeO_2$, $Fe_2O_3$, and other oxides of transition metals, such as $MnO_2$. These oxides may introduce unwanted color to the glass or glass ceramic via visible absorptions in their final valence state(s) in the glass, and thus, when present, their concentration is usually kept at a level of 0.5, 0.4, 0.3, 0.2, 0.1 or >0 wt %.

The glasses or glass ceramics can also contain $SnO_2$ either as a result of Joule melting using tin-oxide electrodes, through the batching of tin containing materials, e.g., $SnO_2$, SnO, $SnCO_3$, $SnC_2O_2$, etc., or through addition of $SnO_2$ as an agent to adjust various physical, melting, color, or forming attributes. The glass or glass ceramic can comprise from 0 to about 3 wt %, 0 to about 2 wt %, 0 to about 1 wt %, 0 to 0.5 wt %, or 0 to 0.1 wt % $SnO_2$.

In some embodiments, the glass or glass ceramic can be substantially free of $Sb_2O_3$, $As_2O_3$, or combinations thereof. For example, the glass or glass ceramic can comprise 0.05 weight percent or less of $Sb_2O_3$ or $As_2O_3$ or a combination thereof, the glass or glass ceramic may comprise 0 wt % of $Sb_2O_3$ or $As_2O_3$ or a combination thereof, or the glass or glass ceramic may be, for example, free of any intentionally added $Sb_2O_3$, $As_2O_3$, or combinations thereof.

Additional components can be incorporated into the glass compositions to provide additional benefits or alternatively, can further comprise contaminants typically found in commercially-prepared glass. For example, additional components can be added to adjust various physical, melting, and forming attributes. The glasses, according to some embodiments, can also include various contaminants associated with batch materials and/or introduced into the glass by the melting, fining, and/or forming equipment used to produce the glass (e.g., $ZrO_2$). In some embodiments, the glass may comprise one or more compounds useful as ultraviolet radiation absorbers. In some embodiments, the glass can comprise 3 wt % or less $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $Fe_2O_3$, $CeO_2$, or combinations thereof. In some embodiments, the glass can comprise from 0 to about 3 wt %, 0 to about 2 wt %, 0 to about 1 wt %, 0 to 0.5 wt %, 0 to 0.1 wt %, 0 to 0.05 wt %, or 0 to 0.01 wt % $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$ or combinations thereof.

In some embodiments, the glasses described herein can be manufactured into sheets via processes, including but not limited to, slot draw, float, rolling, and other sheet-forming processes known to those skilled in the art. Alternatively, glass compositions may be formed via float or rolling processes known in the art.

In some embodiments, the glass compositions described here may be compatible with float-type forming processes with an adjustment of the liquidus viscosity. In some embodiments, the glass composition can have a liquidus viscosity of from about 1500 P to about 3000 P. In some embodiments, the glass composition can have a liquidus viscosity of about 1000, 1200, 1500, 2000, 2500, or 3000 P.

In some embodiments, the glass can have a coefficient of thermal expansion of about $50 \times 10^{-7}$/K or greater, about $50 \times 10^{-7}$/K or greater, about $60 \times 10^{-7}$/K or greater, about $61 \times 10^{-7}$/K or greater, about $62 \times 10^{-7}$/K or greater, about $63 \times 10^{-7}$/K or greater, about $64 \times 10^{-7}$/K or greater, about $65 \times 10^{-7}$/K or greater, about $66 \times 10^{-7}$/K or greater, about $67 \times 10^{-7}$/K or greater, about $68 \times 10^{-7}$/K or greater, about $69 \times 10^{-7}$/K or greater, about $70 \times 10^{-7}$/K or greater, about $71 \times 10^{-7}$/K or greater, about $72 \times 10^{-7}$/K or greater, about $73 \times 10^{-7}$/K or greater, about $74 \times 10^{-7}$/K or greater, about $75 \times 10^{-7}$/K or greater, about $76 \times 10^{-7}$/K or greater, about $77 \times 10^{-7}$/K or greater, about $78 \times 10^{-7}$/K or greater, about $79 \times 10^{-7}$/K or greater, or about $80 \times 10^{-7}$/K or greater.

The articles formed from the glasses and glass ceramics described herein can be any thickness that is reasonably useful. Glass sheet and/or glass ceramic embodiments may have a thickness anywhere from about 0.8 mm to about 10 mm. Some embodiments have thickness of about 6 mm or less, about 5 mm or less, about 3 mm or less, about 1.0 mm or less, about 750 μm or less, about 500 μm or less, or about 250 μm or less. Some glass or glass ceramic sheet embodiments may have thickness of from about 200 μm to about 5 mm, about 500 μm to about 5 mm, about 200 μm to about 4 mm, about 200 μm to about 2 mm, about 400 μm to about 5 mm, or about 400 μm to about 2 mm. In some embodiments, the thickness may be from about 3 mm to about 6 mm or from about 0.8 mm to about 3 mm.

In some embodiments, the glass ceramic has an equibiaxial flexural strength of about 300 MPa or greater, about 325 MPa or greater, about 350 MPa or greater, about 375 MPa or greater, about 400 MPa or greater, about 425 MPa or greater, or about 450 MPa or greater on a 1 mm thick glass-ceramic. The equibiaxial flexural strength can also be referred to as ring-on-ring (RoR) strength, which is measured according the procedure set forth in ASTM: C1499-05, with a few modifications to test fixtures and test conditions as outlined in U.S. Patent Publication No. 2013/0045375, at [0027], which is incorporated herein by reference. An abraded ring-on-ring (aRoR) strength can also be measured using the procedure described above if the glass-ceramic is first subjected to abrasion, typically with silicon carbide particles. Some embodiments also include a chemically-strengthenable glass ceramic with a petalite phase that leads to increased flexural strength. In such embodiments, the RoR strength may be about 500 MPa or greater, about 550 MPa or greater, about 600 MPa or greater, about 650 MPa or greater, about 700 MPa or greater, about 750 MPa or greater, or about 800 MPa or greater.

Some embodiments of the glass ceramics exhibit high fracture toughness and an inherent damage resistance. As mentioned above, some embodiments of the glass ceramic include interlocking lithium silicate crystals, which result in a high fracture toughness. The glass ceramic of one or more embodiment may include boron, which may be present as three-coordinated boron in the residual glass phase of the glass ceramic. In such embodiments, the three-coordinated boron is provided by the inclusion of $B_2O_3$ in the precursor glass. The three-coordinated boron provides a densification mechanism when the glass or glass ceramic is subjected to an indentation load.

In one or more embodiments, the glass ceramics exhibit a fracture toughness of about 1.0 MPa·m$^{1/2}$ or greater, about 1.1 MPa·m$^{1/2}$ or greater, 1.2 MPa·m$^{1/2}$ or greater, 1.3 MPa·m$^{1/2}$ or greater, 1.4 MPa·m$^{1/2}$ or greater, 1.5 MPa·m$^{1/2}$ or greater, 1.6 MPa·m$^{1/2}$ or greater, 1.7 MPa·m$^{1/2}$ or greater, 1.8 MPa·m$^{1/2}$ or greater, 1.9 MPa·m$^{1/2}$ or greater, or about 2.0 MPa·m$^{1/2}$ In some embodiments, the fracture toughness is in the range from about 1 to about 2 MPa·m$^{1/2}$. The fracture toughness may be measured using known methods in the art, for example, using a chevron notch short beam, according to ASTM C1421-10, "Standard Test Methods for Determination of Fracture Toughness of Advanced Ceramics at Ambient Temperature".

In one or more embodiments, the glass ceramics have high crack and scratch resistance by exhibiting a Vickers hardness. In some embodiments, a non-ion-exchanged glass ceramic exhibits a Vickers hardness in the range from about 600 to about 900 kgf/mm$^2$, about 600 to about 875 kgf/mm$^2$, about 600 to about 850 kgf/mm$^2$, about 600 to about 825 kgf/mm$^2$, about 600 to about 800 kgf/mm$^2$, about 600 to about 775 kgf/mm$^2$, about 600 to about 750 kgf/mm$^2$, about 600 to about 725 kgf/mm$^2$, about 600 to about 700 kgf/mm$^2$, from about 700 to about 900 kgf/mm$^2$, about 700 to about 875 kgf/mm$^2$, about 700 to about 850 kgf/mm$^2$, about 700 to about 825 kgf/mm$^2$, or about 700 to about 800 kgf/mm$^2$. In some embodiments, a Vickers hardness is 600 kgf/mm$^2$ or greater, 625 kgf/mm$^2$ or greater, 650 kgf/mm$^2$ or greater, 675 kgf/mm$^2$ or greater, 700 kgf/mm$^2$ or greater, 725 kgf/mm$^2$ or greater, 750 kgf/mm$^2$ or greater, 775 kgf/mm$^2$ or greater, 800 kgf/mm$^2$ or greater, 825 kgf/mm$^2$ or greater, 850 kgf/mm$^2$ or greater, 875 kgf/mm$^2$ or greater, or 900 kgf/mm$^2$ or greater. Vickers hardness may be measured using ASTM C1326 and C1327 (and its progeny, all herein incorporated by reference) "Standard Test Methods for Vickers Indentation Hardness of Advanced Ceramics," ASTM International, Conshohocken, Pa., US. In some embodiments, the glass ceramics exhibit such Vickers indentation crack initiation load values after being chemically strengthened via ion exchange.

In some embodiments, the glass ceramics disclosed herein are not frangible upon being ion-exchanged. As used herein, the terms "frangible" and "frangibilty" refer to the energetic fracture of a glass ceramic plate or sheet, when subjected to a point impact by an object or a drop onto a solid surface with sufficient force to break the glass ceramic plate into multiple small pieces, with either multiple crack branching (i.e., greater than 5 multiple cracks branching from an initial crack) in the glass, ejection of pieces from their original location of at least two inches (about 5 cm), a fragmentation density of greater than about 5 fragments/cm$^2$ of the plate, or any combination of these three conditions. Conversely, a glass ceramic plate is deemed to be not frangible if it either does not break or breaks with less than five multiple cracks branching from an initial crack with pieces ejected less than two inches from their original location when subjected to a point impact by an object or a drop onto a solid surface with sufficient force to break the glass ceramic plate.

Figure 10:
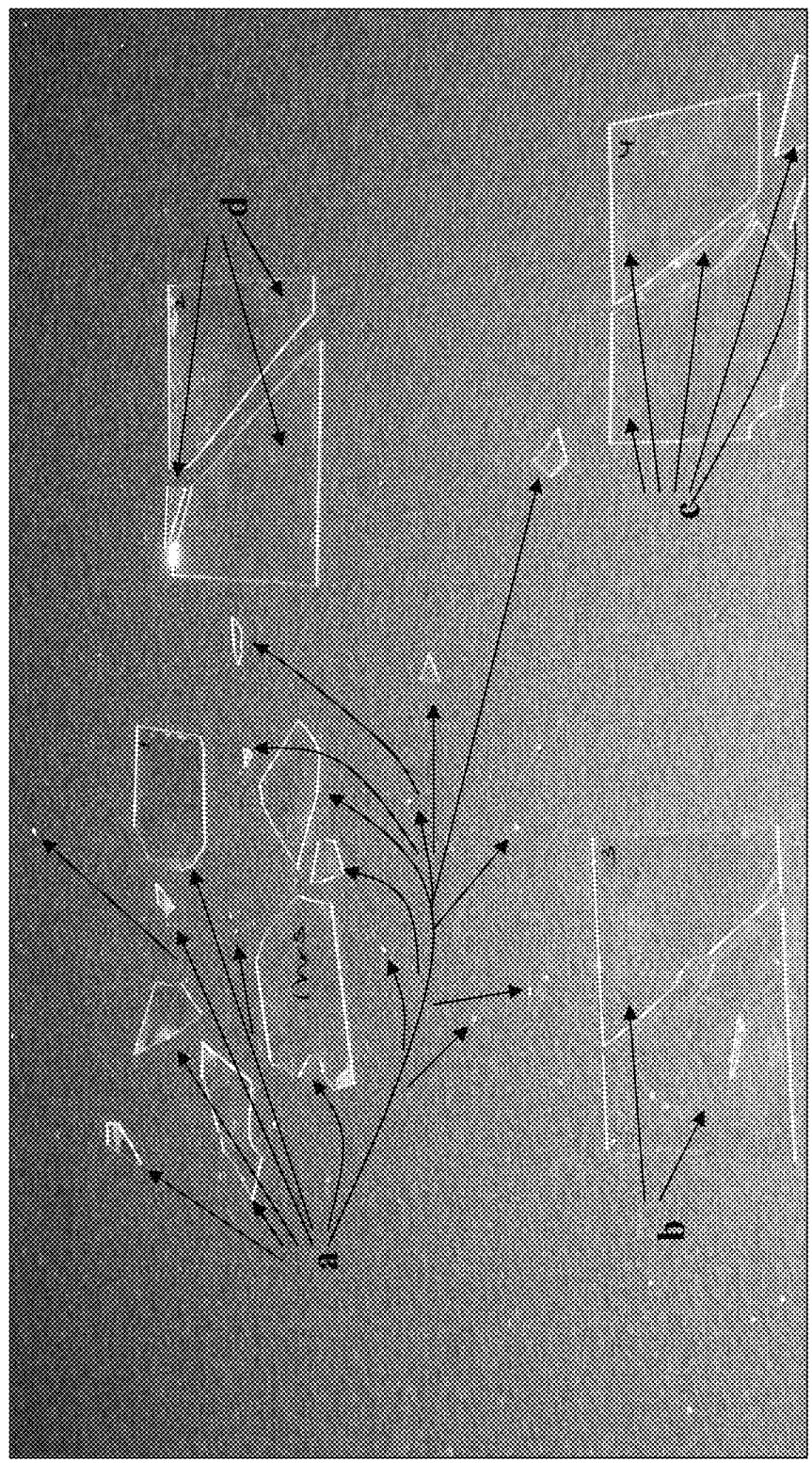
FIG. 10 is a photograph showing ion-exchanged glass-ceramic sheets with different break patterns.

Examples of frangible and non-frangible behavior observed for 5 cm×5 cm glass ceramic plates, each having a thickness of 0.5 mm, are shown in FIG. 10. Glass ceramic plate a exhibits frangible behavior, as evidenced by the multiple small pieces that have been ejected more than two inches, and a large degree of crack branching from the initial crack to produce the small pieces. In contrast to glass ceramic plate a, glass ceramic plates b, c, and d do not exhibit frangible behavior. In these instances, the glass ceramic plate breaks into a small number of large pieces that are not forcefully ejected 2 inches from their original location ("X" is the approximate center of glass plate a before fracture). Glass ceramic plate b has broken into two large pieces with no crack branching; glass ceramic plate c has broken into four pieces with two cracks branching from the initial crack; and glass ceramic plate d has broken into four pieces with two cracks branching from the initial crack.

In addition, all of the compositions and glasses and/or glass ceramics compositions are ion exchangeable by those methods widely known in the art. In typical ion exchange processes, smaller metal ions in the glass are replaced or "exchanged" by larger metal ions of the same valence within a layer that is close to the outer surface of the glass and/or glass ceramic. The replacement of smaller ions with larger ions creates a compressive stress within the layer of the glass and/or glass ceramic. In one embodiment, the metal ions are monovalent alkali metal ions (e.g., $Na^+$, $K^+$, $Rb^+$, $Cs^+$ and the like), and ion exchange is accomplished by immersing the glass and/or glass ceramic in a bath comprising at least one molten salt of the larger metal ion that is to replace the smaller metal ion in the glass. Alternatively, other monovalent ions such as $Ag^+$, $Tl^+$, $Cu^+$, and the like may be exchanged for monovalent ions. The ion exchange process or processes that are used to strengthen the glass and/or glass ceramic can include, but are not limited to, immersion in a single bath or multiple baths of like or different compositions with washing and/or annealing steps between immersions. In one or more embodiments, the glasses and/or glass-ceramics may be ion exchanged by exposure to molten $NaNO_3$ at a temperature of about 430° C. In such embodiments, the Na+ ions replace some portion of the Li ions in the glass ceramic to develop a surface compressive layer and exhibit high crack resistance. The resulting compressive stress layer may have a depth (also referred to as a "depth of layer") of at least 100 μm on the surface of the glass in about 2 hours. In such embodiments, the depth-of-layer can be determined from the $Na_2O$ concentration profile. In other examples, embodiments may be ion exchanged by exposure to molten $KNO_3$ at a temperature of 410° C. for 2 hours to produce a compressive stress layer having a depth of layer of at least about 100 μm. In some embodiments, the glass-ceramics may be ion exchanged to achieve a depth of layer of about 30 μm or greater, about 40 μm or greater, about 50 μm or greater, about 60 μm or greater, about 70 μm or greater, about 80 μm or greater, about 90 μm or greater, or about 100 μm or greater. In other embodiments the glasses are ion exchanged to achieve a central tension of at least 10 MPa. The development of this surface compression layer is beneficial for achieving a better crack resistance and higher flexural strength compared to non-ion-exchanged materials. The surface compression layer has a higher concentration of the ion exchanged into the glass-ceramic article in comparison to the concentration of the ion exchanged into the glass-ceramic article for the body (i.e., area not including the surface compression) of the glass-ceramic article.

In some embodiments, the glass-ceramic can have a surface compressive stress in a range from about 100 MPa to about 500 MPa, about 100 MPa to about 450 MPa, about 100 MPa to about 400 MPa, about 100 MPa to about 350 MPa, about 100 MPa to about 300 MPa, about 100 MPa to about 250 MPa, about 100 MPa to about 200 MPa, about 100 MPa to about 150 MPa, 150 MPa to about 500 MPa, about 150 MPa to about 450 MPa, about 150 MPa to about 400 MPa, about 150 MPa to about 350 MPa, about 150 MPa to about 300 MPa, about 150 MPa to about 250 MPa, about 150 MPa to about 200 MPa, 200 MPa to about 500 MPa, about 200 MPa to about 450 MPa, about 200 MPa to about 400 MPa, about 200 MPa to about 350 MPa, about 200 MPa to about 300 MPa, about 200 MPa to about 250 MPa, 250 MPa to about 500 MPa, about 250 MPa to about 450 MPa, about 250 MPa to about 400 MPa, about 250 MPa to about 350 MPa, about 250 MPa to about 300 MPa, 300 MPa to about 500 MPa, about 300 MPa to about 450 MPa, about 300 MPa to about 400 MPa, about 300 MPa to about 350 MPa, 350 MPa to about 500 MPa, about 350 MPa to about 450 MPa, about 350 MPa to about 400 MPa, 400 MPa to about 500 MPa, about 400 MPa to about 450 MPa, or about 450 MPa to about 500 MPa. In some embodiments, the glass-ceramic can have a surface compressive stress of about 100 MPa or greater, about 150 MPa or greater, about 200 MPa or greater, about 250 MPa or greater, about 300 MPa or greater, about 350 MPa or greater, about 400 MPa or greater, about 450 MPa or greater, or about 500 MPa or greater. Compressive stress and depth of compressive stress layer ("DOL") are measured using those means known in the art. DOL is determined by surface stress meter (FSM) using commercially available instruments such as the FSM-6000, manufactured by Luceo Co., Ltd. (Tokyo, Japan), or the like, and methods of measuring CS and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

In one or more embodiments, the processes for making the glass ceramic includes heat treating the precursor glasses at one or more preselected temperatures for one or more preselected times to induce glass homogenization and crystallization (i.e., nucleation and growth) of one or more crystalline phases (e.g., having one or more compositions, amounts, morphologies, sizes or size distributions, etc.). In some embodiments, the heat treatment can include (i) heating precursor glasses at a rate of 1-10° C./min to a glass pre-nucleation temperature: (ii) maintaining the crystallizable glasses at the glass pre-nucleation temperature for a time in a range from about ¼ hr to about 4 hr to produce pre-nucleated crystallizable glasses; (iii) heating the pre-nucleated crystallizable glasses at a rate of 1-10° C./min to nucleation temperature (Tn); (iv) maintaining the crystallizable glasses at the nucleation temperature for a time in the range from between about ¼ hr to about 4 hr to produce nucleated crystallizable glasses; (v) heating the nucleated crystallizable glasses at a rate in the range from about 1° C./min to about 10° C./min to a crystallization temperature (Tc); (vi) maintaining the nucleated crystallizable glasses at the crystallization temperature for a time in the range from about ¼ hr to about 4 hr to produce the glass ceramic described herein; and (vii) cooling the formed glass ceramic to room temperature. As used herein, the term crystallization temperature may be used interchangeably with ceram or ceramming temperature. In addition, the terms "ceram" or "ceramming" in these embodiments, may be used to refer to steps (v), (vi) and optionally (vii), collectively. In some embodiments, the glass pre-nucleation temperature can be 540° C., the nucleation temperature can be 600° C., and the crystallization temperature can be in a range from 630° C. to 730° C. In other embodiments, the heat treatment does not include maintaining the crystallizable glasses at a glass pre-nucleation temperature. Thus the can heat treatment may include (i) heating precursor glasses at a rate of 1-10° C./min to a nucleation temperature (Tn); (ii) maintaining the crystallizable glasses at the nucleation temperature for a time in the range from between about ¼ hr to about 4 hr to produce nucleated crystallizable glasses; (iii) heating the nucleated crystallizable glasses at a rate in the range from about 1° C./min to about 10° C./min to a crystallization temperature (Tc); (iv) maintaining the nucleated crystallizable glasses at the crystallization temperature for a time in the range from about ¼ hr to about 4 hr to produce the glass ceramic described herein; and (v) cooling the formed glass ceramic to room temperature. The terms "ceram" or "ceramming", in the preceding embodiments, may be used to refer to steps (iii), (iv) and optionally (v), collectively. In some embodiments, the nucleation temperature can be about 700° C., and the crystallization temperature can be about 800° C. In some embodiments, the higher the crystallization temperature, the more β-spodumene ss is produced as a minor crystalline phase.

Temperature-temporal profile of heat treatment steps of heating to the crystallization temperature and maintaining the temperature at the crystallization temperature in addition to precursor glass compositions, are judiciously prescribed so as to produce one or more of the following desired attributes: crystalline phase(s) of the glass ceramic, proportions of one or more major crystalline phases and/or one or more minor crystalline phases and residual glass, crystal phase assemblages of one or more predominate crystalline phases and/or one or more minor crystalline phases and residual glass, and grain sizes or grain size distributions among one or more major crystalline phases and/or one or more minor crystalline phases, which in turn may influence the final integrity, quality, color, and/or opacity, of resultant formed glass ceramic.

The resultant glass ceramic can be provided as a sheet, which can then be reformed by pressing, blowing, bending, sagging, vacuum forming, or other means into curved or bent pieces of uniform thickness. Reforming can be done before thermally treating or the forming step can also serve as a thermal treatment step where both forming and thermally treating are performed substantially simultaneously.

In yet other embodiments, the precursor glass compositions used to form the glass ceramic can be formulated, for example, so that the glass ceramic is capable of being chemically strengthened using one or more ion exchange techniques. In these embodiments, ion exchange can occur by subjecting one or more surfaces of such glass ceramic to one or more ion exchange baths, having a specific composition and temperature, for a specified time period to impart to the one or more surfaces with compressive stress layer(s). The compressive stress layer can include one or more average surface compressive stress (CS), and/or one or more depths of layer.

EXAMPLES

Efforts have been made to ensure accuracy with respect to numbers (e.g., amounts, temperature, etc.) but some errors and deviations should be accounted for. Unless indicated otherwise, temperature is in ° C. or is at ambient temperature, and pressure is at or near atmospheric. The compositions themselves are given in wt % on an oxide basis and have been normalized to 100%. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1

Example glass and glass ceramic compositions (in terms of wt %) and properties for achieving transparent glass ceramics are set forth in the Table 1 and were determined in accordance with techniques conventional in the glass art. Precursor glasses were formed having the compositions 1-16 listed in Table 1. The precursor glasses were then subjected to a ceramming cycle having a glass homogenization hold at 540° C. for 4 hours, a nucleation hold at 600° C. for 4 hours, and a crystallization hold at a temperature in a range from 630 to 730° C. for 4 hours. The following nomenclature was used in Table 1 to describe the ceramming cycle: glass homogenization temperature—hold time/nucleation temperature—hold time/crystallization temperature—hold time.

The liquidus temperature is the temperature where the first crystal is observed in a standard gradient boat liquidus measurement (ASTM C829-81 and it progeny). This involves placing crushed glass particles in a platinum boat, placing the boat in a furnace having a region of gradient temperatures, heating the boat in an appropriate temperature region for 24 or 72 hours, and determining by means of microscopic examination the highest temperature at which crystals appear in the interior of the glass. More particularly, the glass sample is removed from the Pt boat in one piece, and examined using polarized light microscopy to identify the location and nature of crystals which have formed against the Pt and air interfaces, and in the interior of the sample. Because the gradient of the furnace is very well known, temperature vs. location can be well estimated, within 5-10° C. The temperature at which crystals are observed in the internal portion of the sample is taken to represent the liquidus of the glass (for the corresponding test period). Testing is sometimes carried out at longer times (e.g. 72 hours), in order to observe slower growing phases. The liquidus viscosity in poises was determined from the liquidus temperature and the coefficients of the Fulcher equation.

scanning calorimetry (DSC) trace was performed for Composition 2 plotting DSC/(mW/mg) vs. temperature in degrees Celsius. The trace was used to show that a fine-grained microstructure can be achieved by ceramming at low temperatures relative to crystallization temperatures.

Figure 2:
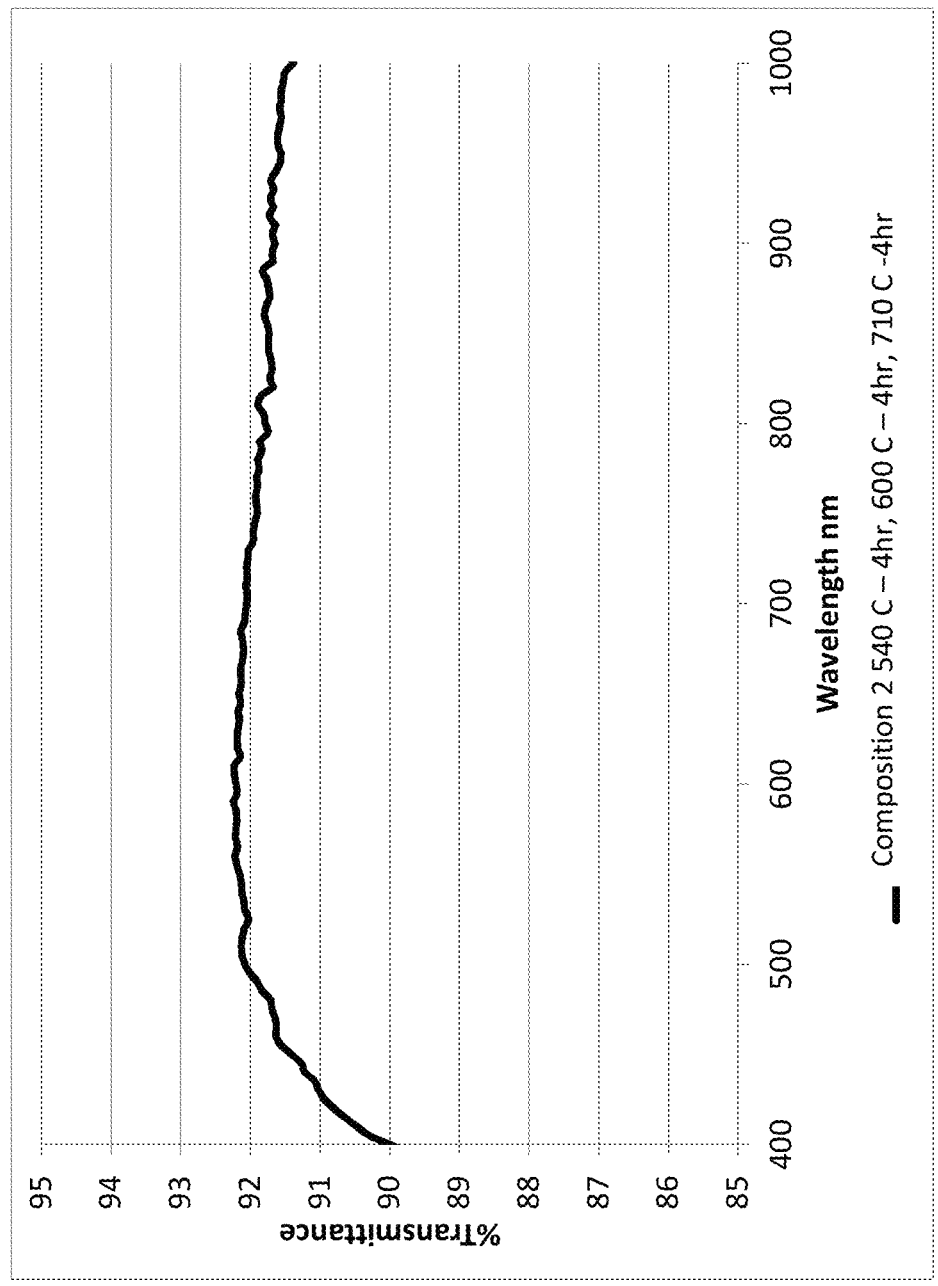
FIG. 2 is a plot of the transmittance of an exemplary glass-ceramic composition for light having a wavelength from 400 nm to 1,000 nm at a sample thickness of 1 mm.

The transmittance of glass-ceramic composition 2 having a thickness of 1 mm was measured for light having a wavelength from 400 nm to 1,000 nm. As shown in FIG. 2, the average transmittance of glass-ceramic composition 2 in the visible light wavelength is greater than 90%.

A sample of glass-ceramic composition 2 was observed using a scanning electron microscope (SEM) to determine

TABLE 1

| Composition | 1 | 2 | 3 | 4 | 5 | 6 | 7 | 8 |
|---|---|---|---|---|---|---|---|---|
| $SiO_2$ (wt %) | 78.3 | 78.3 | 78.3 | 78.3 | 78.3 | 78.3 | 78.3 | 78.3 |
| $Al_2O_3$ (wt %) | 7.5 | 8.1 | 8.7 | 8.1 | 8.1 | 8.1 | 8.1 | 8.1 |
| $B_2O_3$ (wt %) | 0.0 | 0.2 | 0.4 | 1.0 | 2.0 | 4.0 | 5.0 | 6.0 |
| $Li_2O$ (wt %) | 12.5 | 11.9 | 11.3 | 11.9 | 11.9 | 11.9 | 11.9 | 11.9 |
| $Na_2O$ (wt %) | 1.7 | 1.7 | 1.7 | 1.7 | 1.7 | 1.7 | 1.7 | 1.7 |
| $K_2O$ (wt %) | 0.0 | 0.0 | 0.0 | 0.0 | 0.0 | 0.0 | 0.0 | 0.0 |
| ZnO (wt %) | 0.0 | 0.0 | 0.0 | 0.0 | 0.0 | 0.0 | 0.0 | 0.0 |
| $ZrO_2$ (wt %) | 4.0 | 4.0 | 4.0 | 4.0 | 4.0 | 4.0 | 4.0 | 4.0 |
| $P_2O_5$ (wt %) | 2.0 | 2.2 | 2.4 | 2.2 | 2.2 | 2.2 | 2.2 | 2.2 |
| Ceramming cycle | 540° C.-4 hr/ 600° C.-4 hr/ 730° C.-4 hr | 540° C.-4 hr/ 600° C.-4 hr/ 710° C.-4 hr | 540° C.-4 hr/ 600° C.-4 hr/ 730° C.-4 hr | 540° C.-4 hr/ 600° C.-4 hr/ 690° C.-4 hr | 540° C.-4 hr/ 600° C.-4 hr/ 650° C.-4 hr | 540° C.-4 hr/ 600° C.-4 hr/ 630° C.-4 hr | 540° C.-4 hr/ 600° C.-4 hr/ 630° C.-4 hr | 540° C.-4 hr/ 600° C.-4 hr/ 630° C.-4 hr |
| Phase assemblage | Petalite, lithium disilicate | Petalite, lithium disilicate | Petalite, lithium disilicate | Petalite, lithium disilicate | Petalite, lithium disilicate | Petalite, lithium disilicate | Petalite, lithium disilicate | Petalite, lithium disilicate |
| Appearance | Slight hazy, transparent | Clear, transparent | Slight hazy, transparent | Clear, transparent | Clear, transparent | Slight hazy, transparent | Slight hazy, transparent | Slight hazy, transparent |
| Liquidus temperature (° C.) | 1030 | 1050 | 1070 | — | — | — | — | — |
| Liquidus viscosity (poise) | 3700 | 3800 | 3800 | — | — | — | — | — |

| Composition | 9 | 10 | 11 | 12 | 13 | 14 | 15 | 16 |
|---|---|---|---|---|---|---|---|---|
| $SiO_2$ (wt %) | 76.3 | 74.3 | 72.3 | 70.3 | 78.3 | 78.3 | 78.3 | 78.3 |
| $Al_2O_3$ (wt %) | 10.1 | 12.1 | 14.1 | 16.1 | 8.1 | 8.1 | 8.1 | 8.1 |
| $B_2O_3$ (wt %) | 0.2 | 0.2 | 0.2 | 0.2 | 2.0 | 2.0 | 2.0 | 2.0 |
| $Li_2O$ (wt %) | 11.9 | 11.9 | 11.9 | 11.9 | 11.9 | 11.9 | 11.9 | 11.9 |
| $Na_2O$ (wt %) | 1.7 | 1.7 | 1.7 | 1.7 | 0.0 | 0.0 | 0.0 | 0.0 |
| $K_2O$ (wt %) | 0.0 | 0.0 | 0.0 | 0.0 | 1.5 | 3.0 | 0.0 | 0.0 |
| ZnO (wt %) | 0.0 | 0.0 | 0.0 | 0.0 | 0.0 | 0.0 | 1.5 | 3.0 |
| $ZrO_2$ (wt %) | 4.0 | 4.0 | 4.0 | 4.0 | 4.0 | 4.0 | 4.0 | 4.0 |
| $P_2O_5$ (wt %) | 2.2 | 2.2 | 2.2 | 2.2 | 2.2 | 2.2 | 2.2 | 2.2 |
| Ceramming cycle | 540° C.-4 hr/ 600° C.-4 hr/ 710° C.-4 hr | 540° C.-4 hr/ 600° C.-4 hr/ 710° C.-4 hr | 540° C.-4 hr/ 600° C.-4 hr/ 710° C.-4 hr | 540° C.-4 hr/ 600° C.-4 hr/ 710° C.-4 hr | 540° C.-4 hr/ 600° C.-4 hr/ 690° C.-4 hr | 540° C.-4 hr/ 600° C.-4 hr/ 690° C.-4 hr | 540° C.-4 hr/ 600° C.-4 hr/ 690° C.-4 hr | 540° C.-4 hr/ 600° C.-4 hr/ 690° C.-4 hr |
| Phase assemblage | Petalite, lithium disilicate | Petalite, lithium disilicate | Petalite, lithium disilicate | Petalite, lithium disilicate | Petalite, lithium disilicate | Petalite, lithium disilicate | Petalite, lithium disilicate | Petalite, lithium disilicate |
| Appearance | Slight haze, transparent | Hazy, transparent | Translucent white | Translucent creamy white | Clear, transparent | Slight hazy, transparent | Slight hazy, transparent | Translucent white |
| Liquidus temperature (° C.) | — | — | — | — | — | — | — | — |
| Liquidus viscosity (poise) | — | — | — | — | — | — | — | — |

Figure 3A:
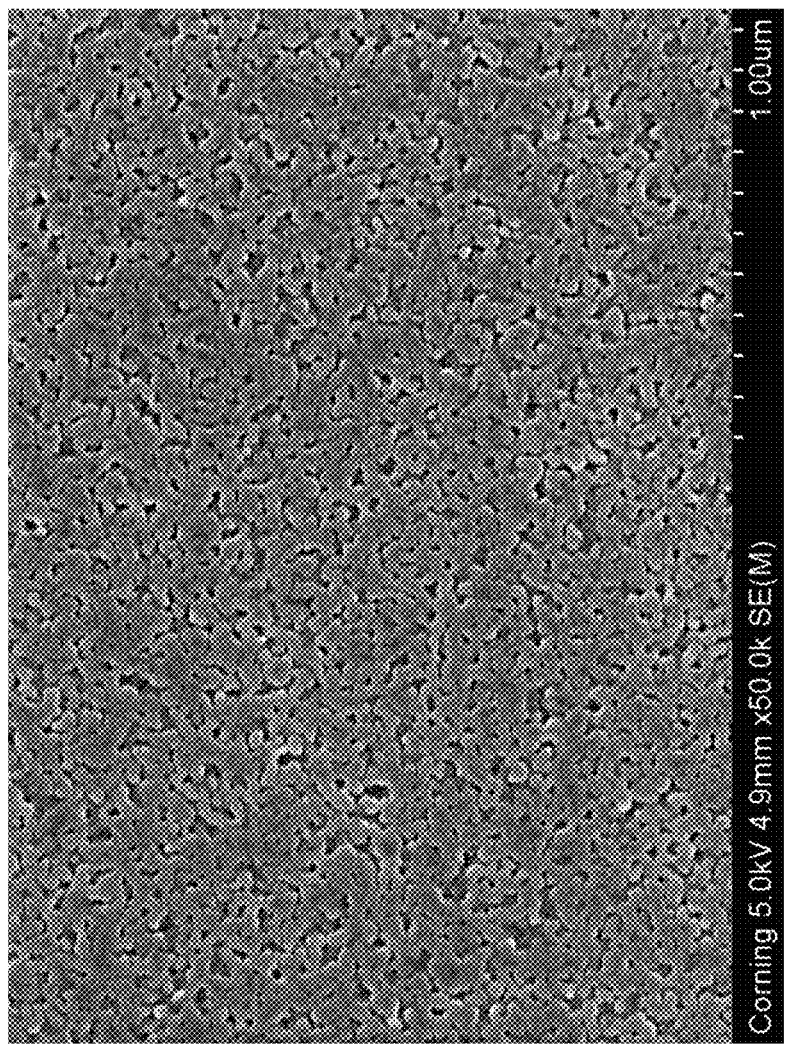
FIG. 3A is a scanning electron microscope (SEM) image of an exemplary glass-ceramic composition on a 200 nm scale.
Figure 3B:
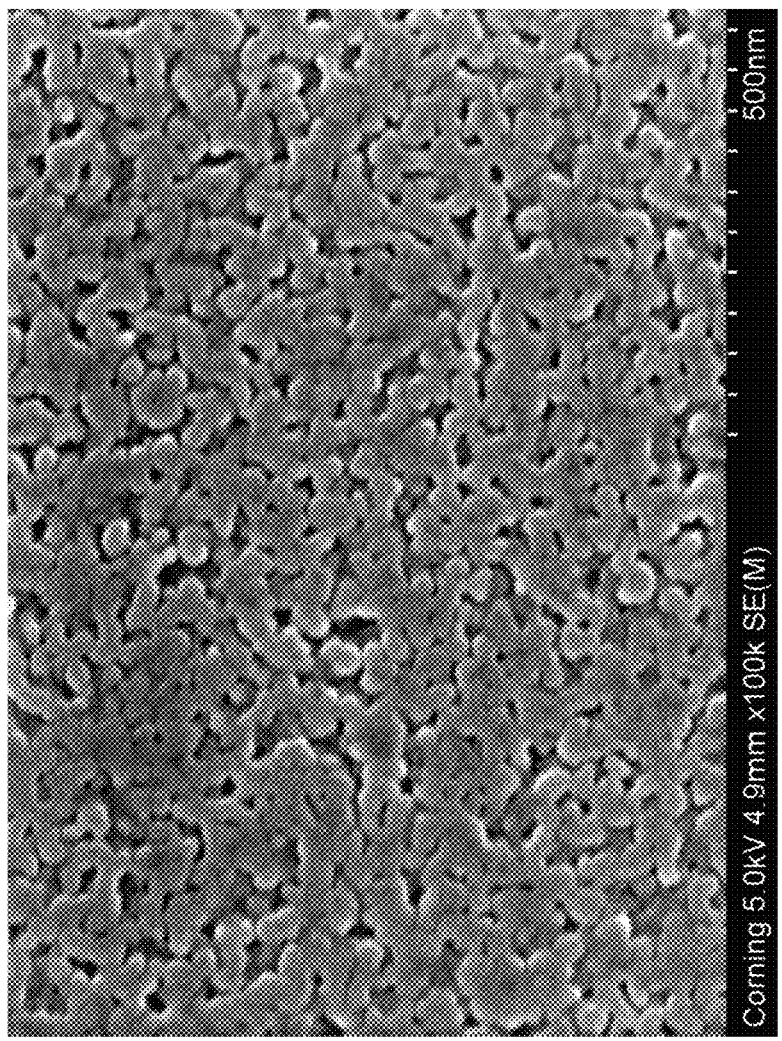
FIG. 3B is a scanning electron microscope (SEM) image of an exemplary glass-ceramic composition on a 100 nm scale.

Several tests were done on Composition 2 after ceramming to determine a variety of properties for the glass-ceramic of Composition 2. As shown in FIG. 1, a differential the grain size of the petalite. FIG. 3A shows the SEM on a 200 nm scale and FIG. 3B shows the SEM on a 100 nm scale. The petalite grains are on the order of 50 to 100 nm.

The fineness of the grains is believed to contribute to the transparency of the glass-ceramic evidenced in FIG. 2.

Figure 4:
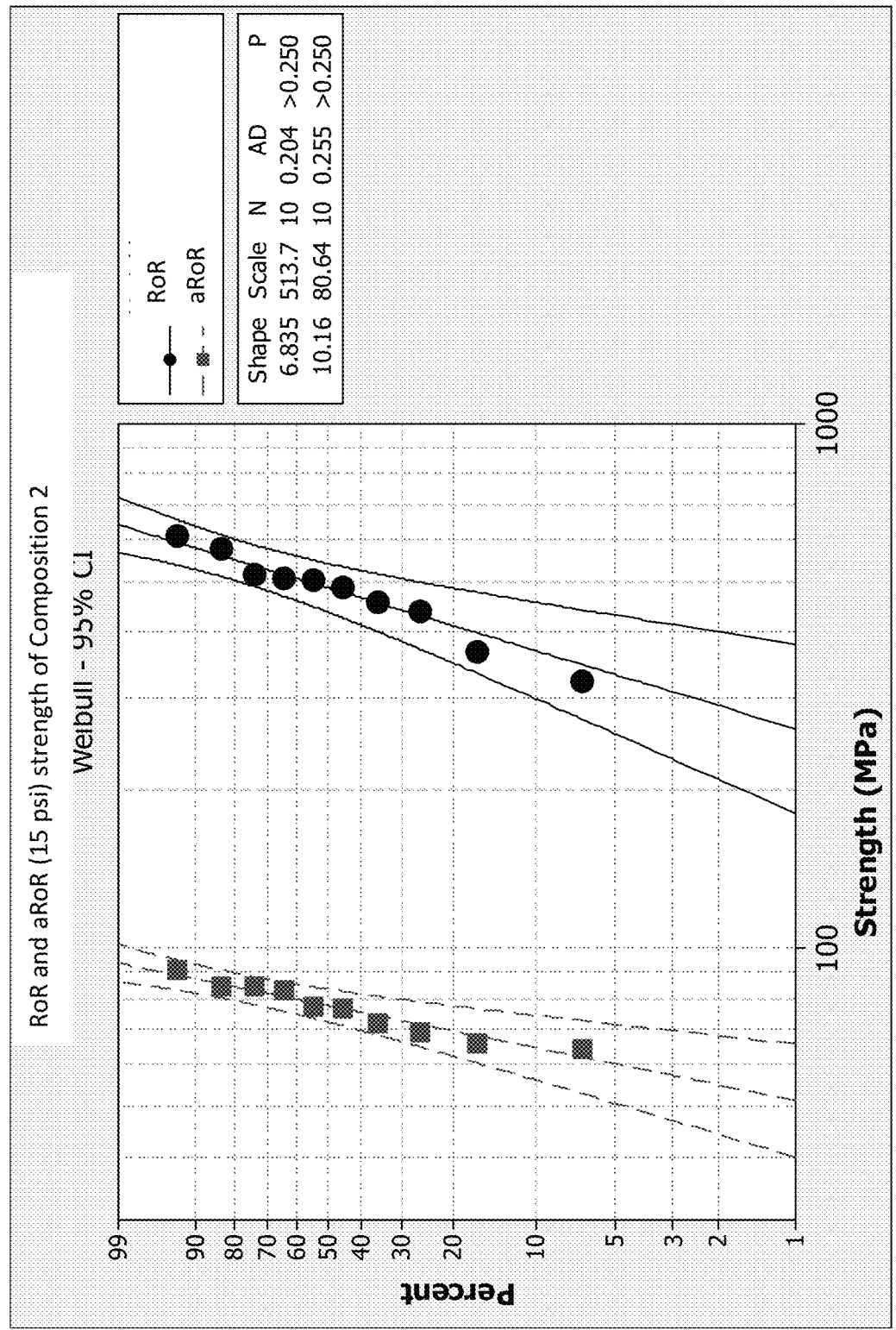
FIG. 4 shows the results of a ring-on-ring (RoR) test and an abraded ring-on-ring (aRoR) test of an exemplary non-ion-exchanged glass-ceramic composition.

Two 50 mm by 50 mm by 1 mm samples of glass-ceramic composition 2 were subjected to a ring-on-ring test as described above to determine the strength of the samples. One sample had been subjected to abrasion (15 psi) and one sample was not. FIG. 4 shows the results of the ring-on-ring test. A strength of 514 MPa was achieved for the ring-on-ring test.

The fracture toughness of a sample of glass-ceramic composition 2 was measured using chevron notched short beam measurements. The fracture toughness was 1.13 MPa·m$^{1/2}$.

The hardness of a sample of glass-ceramic composition was measured to determine the Vickers hardness as described above using a Model 5948 MicroTester, available from Instron. The Vickers hardness was approximately 750 kgf/mm$^2$.

Figure 5:
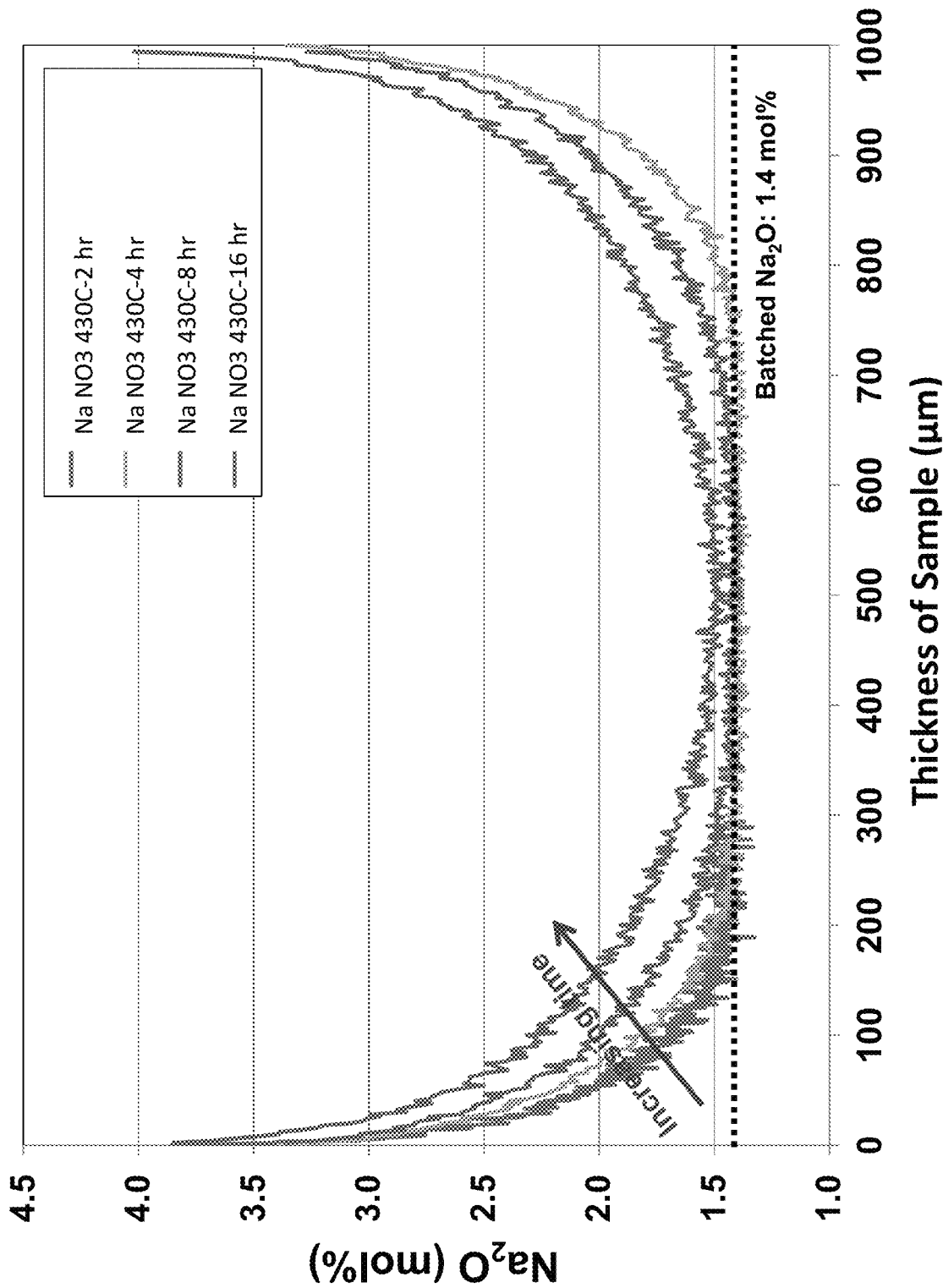
FIG. 5 shows a plot of concentration of $Na_2O$ in mole percent vs. thickness of the sample for an exemplary glass-ceramic composition.

A glass-ceramic of composition 2 was subjected to an ion-exchange process wherein the sample was placed in a molten NaNO$_3$ bath at 430° C. for 2 hours, 4 hours, 8 hours, and 16 hours. As shown in FIG. 5, a depth of layer of over 100 µm was achieved. FIG. 5 also shows a plot of the concentration of Na$_2$O in mole percent vs. thickness of the sample for each ion-exchange treatment. As can be seen, the depth of layer increased with increasing duration of the ion-exchange treatment. Also, a parabolic Na$_2$O concentration was achieved after ion-exchanging for 16 hours.

Figure 6:
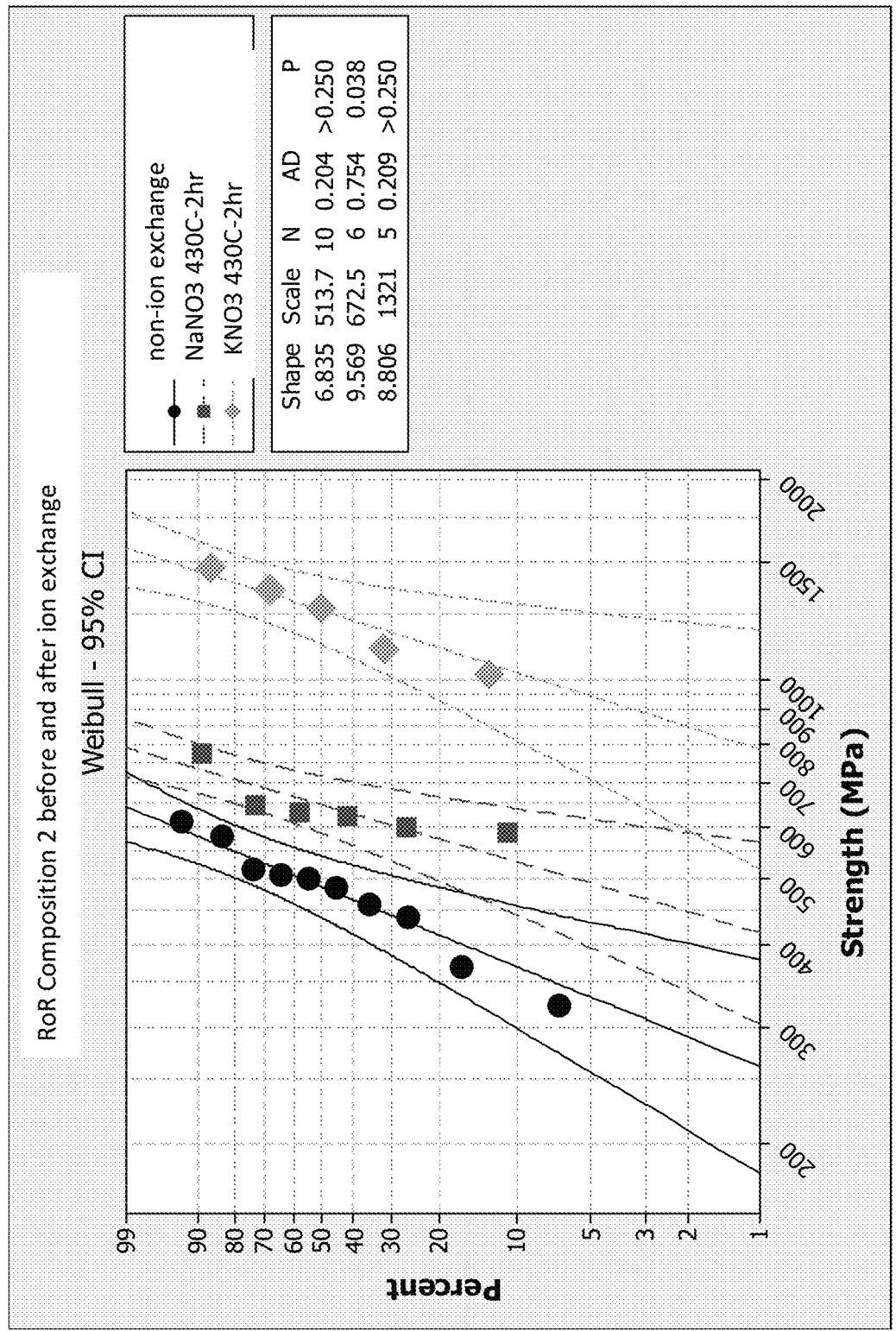
FIG. 6 shows the results of a RoR test of an exemplary glass-ceramic composition before and after ion-exchanging.

Two 50 mm by 50 mm by 1 mm samples glass-ceramic of composition 2 were ion-exchanged. One sample was ion-exchanged in a molten NaNO$_3$ bath at 430° C. for 2 hours and the other sample was ion-exchanged in a molten KNO$_3$ bath at 430° C. for 2 hours. The two ion-exchanged samples and a non-ion-exchanged 50 mm by 50 mm by 1 mm sample of glass-ceramic of composition 2 were subjected to a ring-on-ring test as described above. The results are shown in FIG. 6. The strength of the glass-ceramic had approximately a 30% increase after ion-exchanging with NaNO$_3$ and approximately doubled after ion-exchanging with KNO$_3$. It is believed that ion-exchanging with a KNO$_3$ bath results in a greater depth-of-layer (DOL) for the compressive stress layer formed on the surface of the sample during ion exchange.

Figure 7:
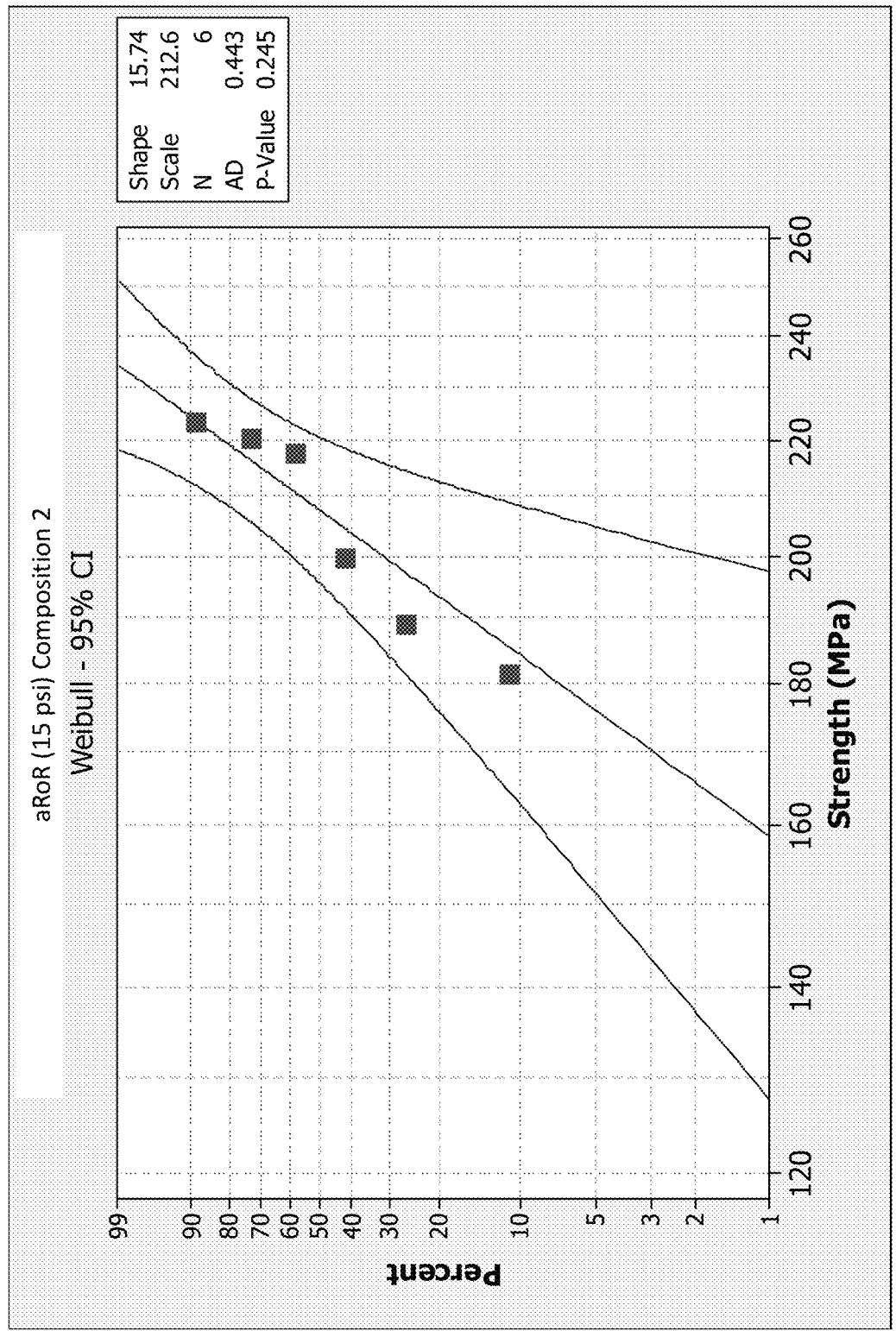
FIG. 7 shows the results of an aRoR test of an exemplary glass-ceramic composition that has been ion-exchanged.

A 50 mm by 50 mm by 1 mm sample of glass-ceramic of composition 2 was ion-exchanged in a molten NaNO$_3$ bath at 430° C. for 2 hours. A 50 mm by 50 mm by 1 mm sample of glass A was ion-exchanged in a molten KNO$_3$ bath at 420° C. for 5.5 hours. A 50 mm by 50 mm by 1 mm sample of glass B was ion-exchanged in a 32% KNO$_3$ molten bath at 540° C. for 8 hours followed by ion-exchanging in a 100% KNO$_3$ molten bath at 390° C. for 15 mins. The samples were all abraded under 15 psi and subjected to an abraded ring-on-ring test as described above. The results are shown in FIG. 7. The glass-ceramic had a higher strength than glass A and had a strength approaching that of glass B. Thus the ion-exchanged glass ceramics can be just as strong or stronger than ion-exchanged glass.

Figure 8:
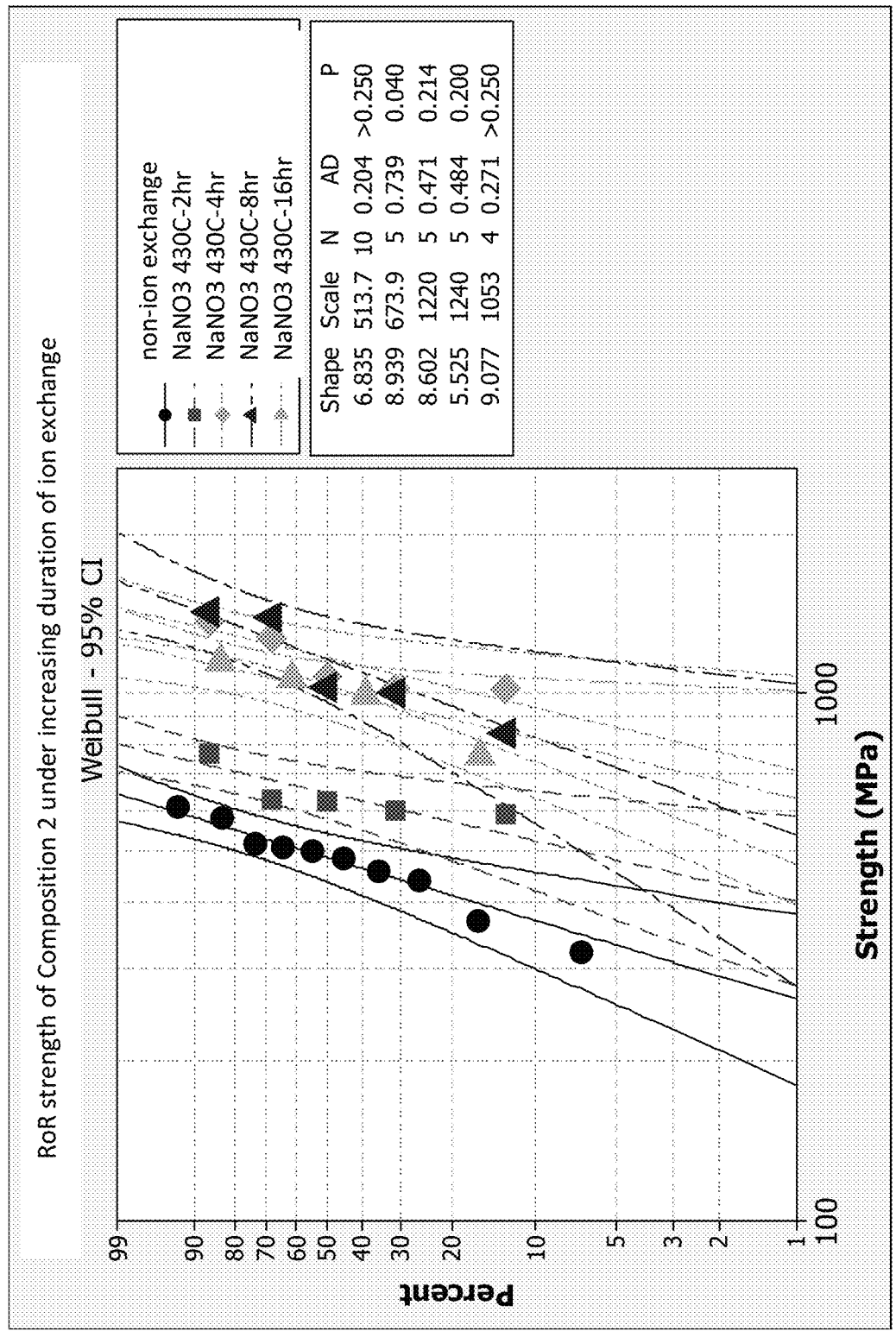
FIG. 8 shows the results of a RoR test of an exemplary glass-ceramic composition ion-exchanged for different durations of time.

50 mm by 50 mm by 1 mm samples of glass-ceramic of composition 2 were ion-exchanged in a molten NaNO$_3$ bath at 430° C. for 2 hours, 4 hours, 8 hours, and 16 hours. The ion-exchanged samples were then subjected to a ring-on-ring test as described above as well as a non-ion-exchanged glass-ceramic sample of composition 2. The results are shown in FIG. 8. The strength of the glass-ceramic increased based on the duration of the ion-exchange.

Figure 9:
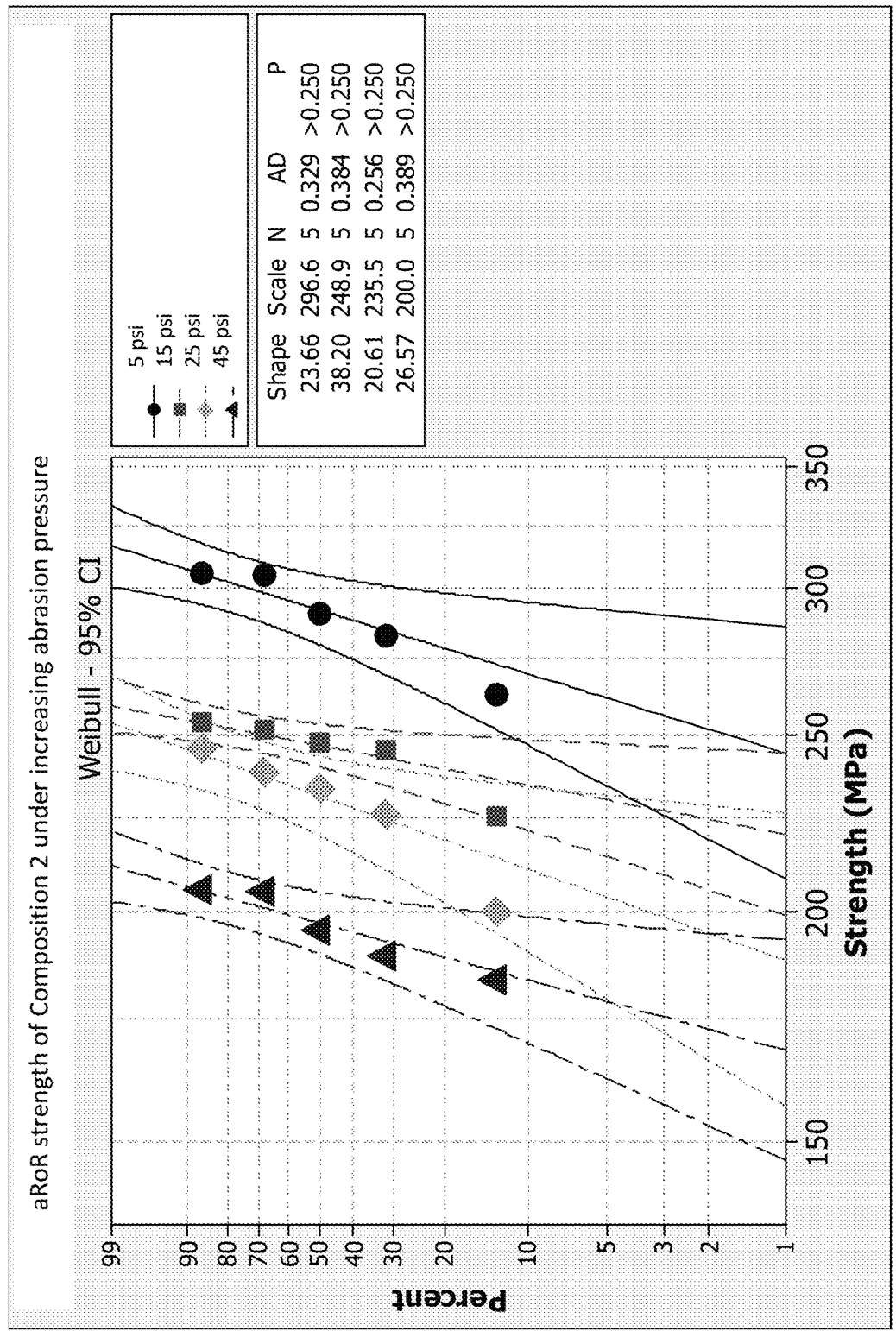
FIG. 9 shows the results of an aRoR test of an exemplary glass-ceramic composition that has been ion-exchanged and abraded under different pressures.

50 mm by 50 mm by 1 mm samples of glass-ceramic of composition 2 were ion-exchanged in a molten NaNO$_3$ bath at 430° C. for 16 hours. The samples were abraded under 15 psi, 25 psi, or 45 psi and subjected to an abraded ring-on-ring test as described above. The results are shown in FIG. 9. The samples abraded under 15 psi had a load failure of about 253 MPa, the samples abraded under 25 psi had a load failure of about 240 MPa, and the samples abraded under 45 psi had a load failure of about 201 MPa.

Example 2

Example glass and glass ceramic compositions (in terms of wt %) and properties for achieving translucent glass ceramics are set forth in the Table 2 and were determined in accordance with techniques conventional in the glass art. Precursor glasses were formed having the compositions 17-29 listed in Table 2. The precursor glasses were then subjected to a ceramming cycle indicated in Table 2 below.

TABLE 2

| Composition | 17 | 18 | 19 | 20 | 21 | 22 | 23 |
|---|---|---|---|---|---|---|---|
| SiO$_2$ (wt %) | 78.3 | 78.3 | 78.3 | 78.3 | 78.3 | 78.3 | 76.3 |
| Al$_2$O$_3$ (wt %) | 10.5 | 9.3 | 9.3 | 9.3 | 7.5 | 8.1 | 8.7 |
| B$_2$O$_3$ (wt %) | 1 | 0.6 | 0.6 | 0.6 | 0.0 | 0.2 | 0.4 |
| Li$_2$O (wt %) | 9.5 | 10.7 | 10.7 | 10.7 | 12.5 | 11.9 | 11.3 |
| Na$_2$O (wt %) | 1.7 | 1.7 | 1.7 | 1.7 | 1.7 | 1.7 | 1.7 |
| K$_2$O (wt %) | 0.0 | 0.0 | 0.0 | 0.0 | 0.0 | 0.0 | 0.0 |
| ZnO (wt %) | 0.0 | 0.0 | 0.0 | 0.0 | 0.0 | 0.0 | 0.0 |
| ZrO$_2$ (wt %) | 4.0 | 4.0 | 6.0 | 8.0 | 4.0 | 4.0 | 4.0 |
| P$_2$O$_5$ (wt %) | 3.0 | 2.0 | 2.0 | 2.0 | 2.0 | 2.2 | 2.4 |
| Ceramming cycle | 700° C.-0.5 hr/800° C.-0.5 hr | 700° C.-0.5 hr/800° C.-0.5 hr | 700° C.-0.5 hr/800° C.-0.5 hr | 700° C.-0.5 hr/800° C.-0.5 hr | 540° C.-4 hr/600° C.-4 hr/730° C.-4 hr | 540° C.-4 hr/600° C.-4 hr/740° C.-4 hr | 540° C.-4 hr/600° C.-4 hr/730° C.-4 hr |
| Phase assemblage | Petalite, lithium disilicate, lithiophosphate | Petalite, lithium disilicate, lithiophosphate | Petalite, lithium disilicate, β-quartz lithiophosphate | Petalite, lithium disilicate, cristobalite, lithiophosphate | Petalite, lithium disilicate | Petalite, lithium disilicate, β-quartz | Petalite, lithium disilicate |

TABLE 2-continued

| Appearance | Translucent white | Translucent white | Translucent white | Translucent white | Slight hazy, transparent | Transparent | Slight hazy, transparent |
|---|---|---|---|---|---|---|---|
| Liquidus temperature (° C.) | 1070 | 1060 | 1055 | 1220 | 1030 | 1050 | 1070 |
| Liquidus viscosity (poise) | 9800 | 5900 | 6100 | 880 | 3700 | 3800 | 3800 |

| Composition | 24 | 25 | 26 | 27 | 28 | 29 |
|---|---|---|---|---|---|---|
| $SiO_2$ (wt %) | 72.3 | 78.3 | 78.3 | 78.3 | 78.3 | 78.3 |
| $Al_2O_3$ (wt %) | 14.1 | 10.5 | 8.1 | 10.1 | 11.1 | 12.1 |
| $B_2O_3$ (wt %) | 0.2 | 1 | 0.2 | 0.2 | 0.2 | 0.2 |
| $Li_2O$ (wt %) | 11.9 | 9.5 | 11.9 | 11.9 | 11.9 | 11.9 |
| $Na_2O$ (wt %) | 1.7 | 0 | 0 | 0 | 0 | 0 |
| $K_2O$ (wt %) | 0.0 | 1.7 | 1.7 | 1.7 | 1.7 | 1.7 |
| ZnO (wt %) | 0.0 | 0 | 0 | 0 | 0 | 0 |
| $ZrO_2$ (wt %) | 4.0 | 4 | 4 | 4 | 4 | 4 |
| $P_2O_5$ (wt %) | 2.2 | 3 | 2.2 | 2.2 | 2.2 | 2.2 |
| Ceramming cycle | 540°C-4 hr/ 600°C-4 hr/ 630°C-4 hr | 540°C-4 hr / 600°C-4 hr / 680°C-2 hr | 540°C-4 hr / 600°C-4 hr / 680°C-2 hr | 540°C-4 hr / 600°C-4 hr / 680°C-2 hr | 540°C-4 hr / 600°C-4 hr / 680°C-2 hr | 540°C-4 hr / 600°C-4 hr / 680°C-2 hr |
| Phase assemblage | β-quartz, petalite, lithium metasilicate | — | — | — | — | — |
| Appearance | Translucent white | Translucent white | Transparent | Transparent | Slighly hazy, transparent | Slighly hazy, transparent |
| Liquidus temperature (° C.) | — | — | — | — | — | — |
| Liquidus viscosity (poise) | — | — | — | — | — | — |

The fracture toughness of a sample of glass-ceramic Composition 17, 18, and 22 were measured using chevron notched short beam measurements. The fracture toughness was 1.2 MPa·m$^{1/2}$, 1.13 MPa·m$^{1/2}$, and 1.2 MPa·m$^{1/2}$, respectively.

Figure 11:
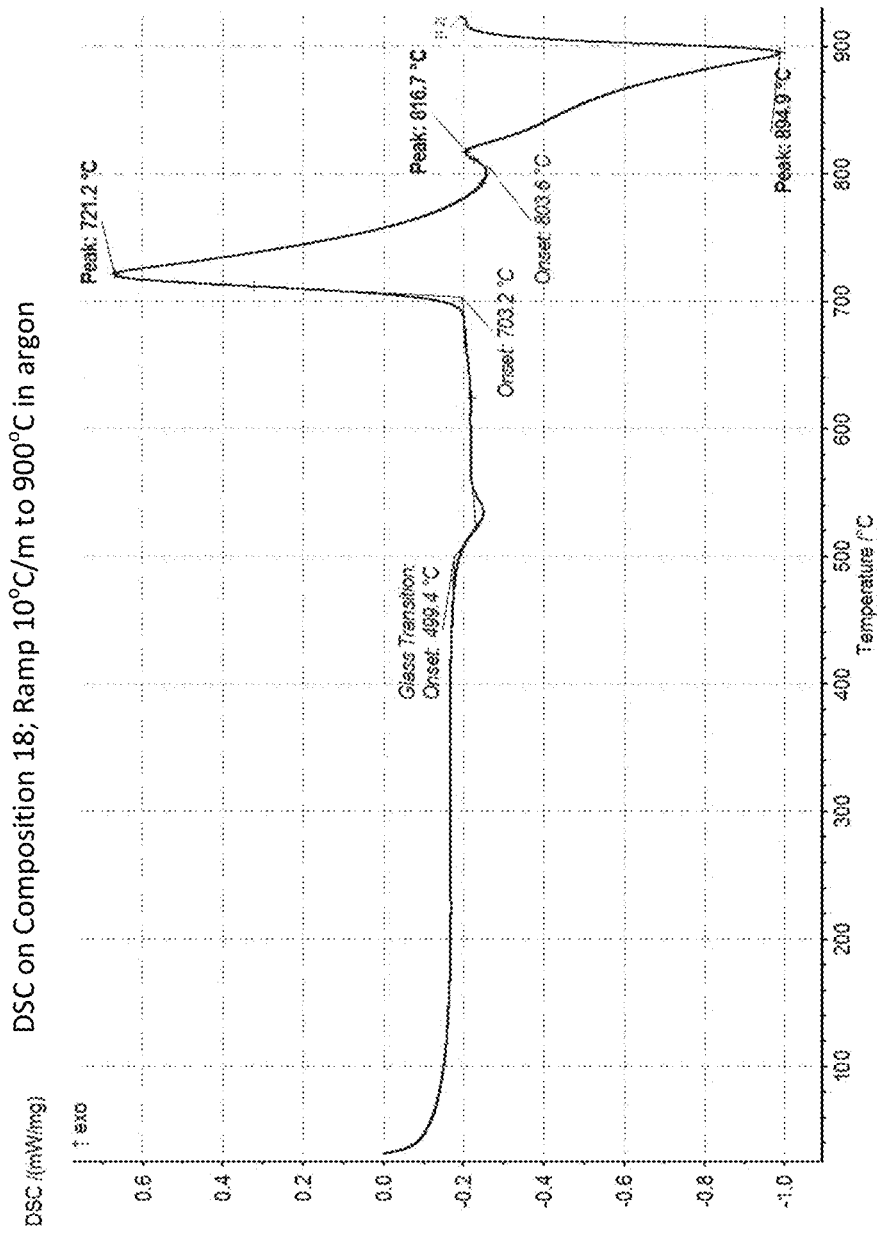
FIG. 11 is a plot of a differential calorimetry (DSC) trace for an exemplary glass-ceramic composition.
Figure 12:
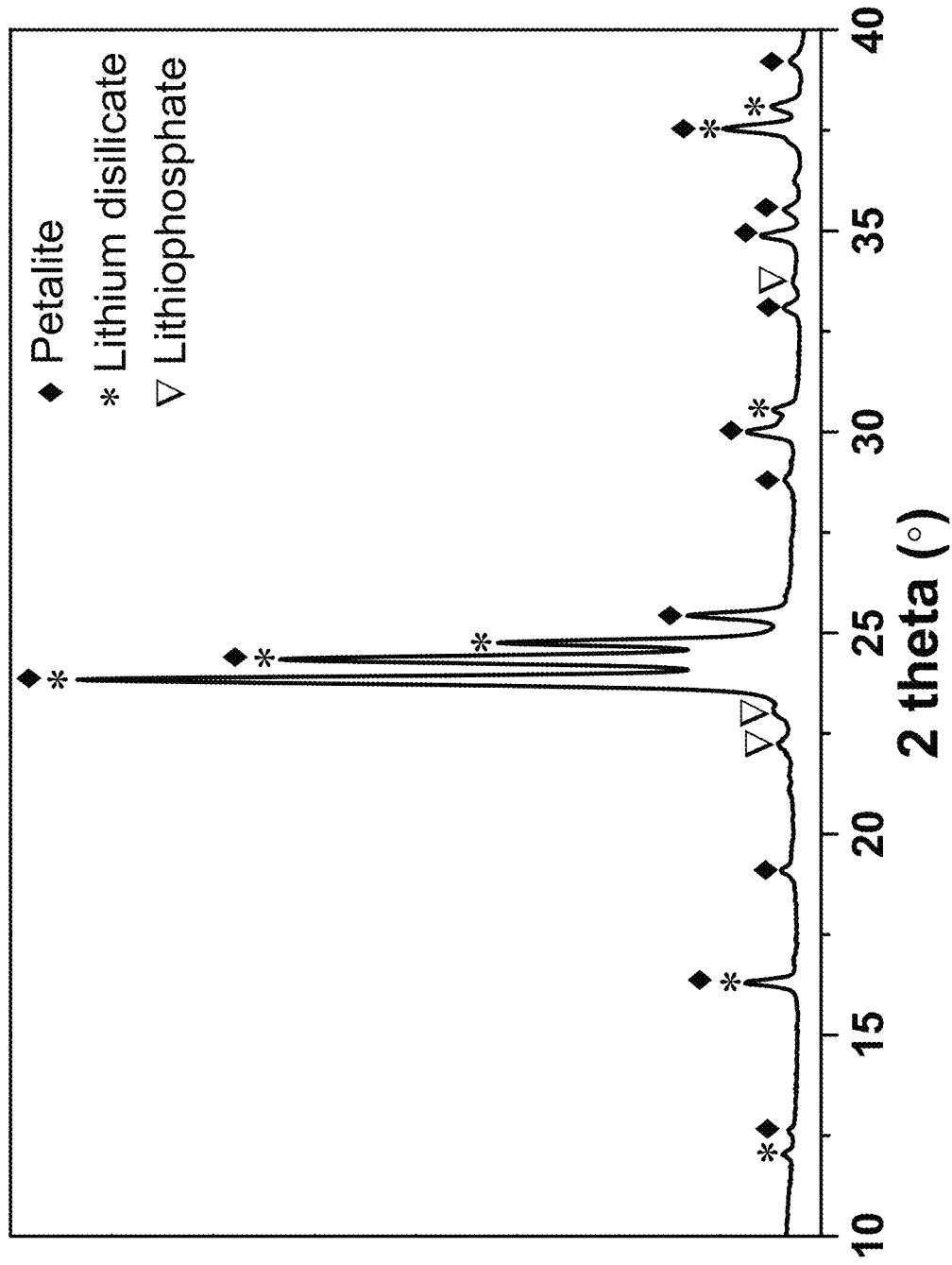
FIG. 12 shows an X-ray diffraction (XRD) spectra of the crystalline phases of an exemplary glass-ceramic composition.

As shown in FIG. 11, a differential scanning calorimetry (DSC) trace was performed for Composition 18 plotting DSC/(mW/mg) vs. temperature in degrees Celsius. FIG. 12, is an X-ray diffraction (XRD) spectra of the crystalline phases formed in Composition 18. It can be seen from the XRD spectra that petalite and lithium disilicate are the major crystalline phases.

Figure 13:
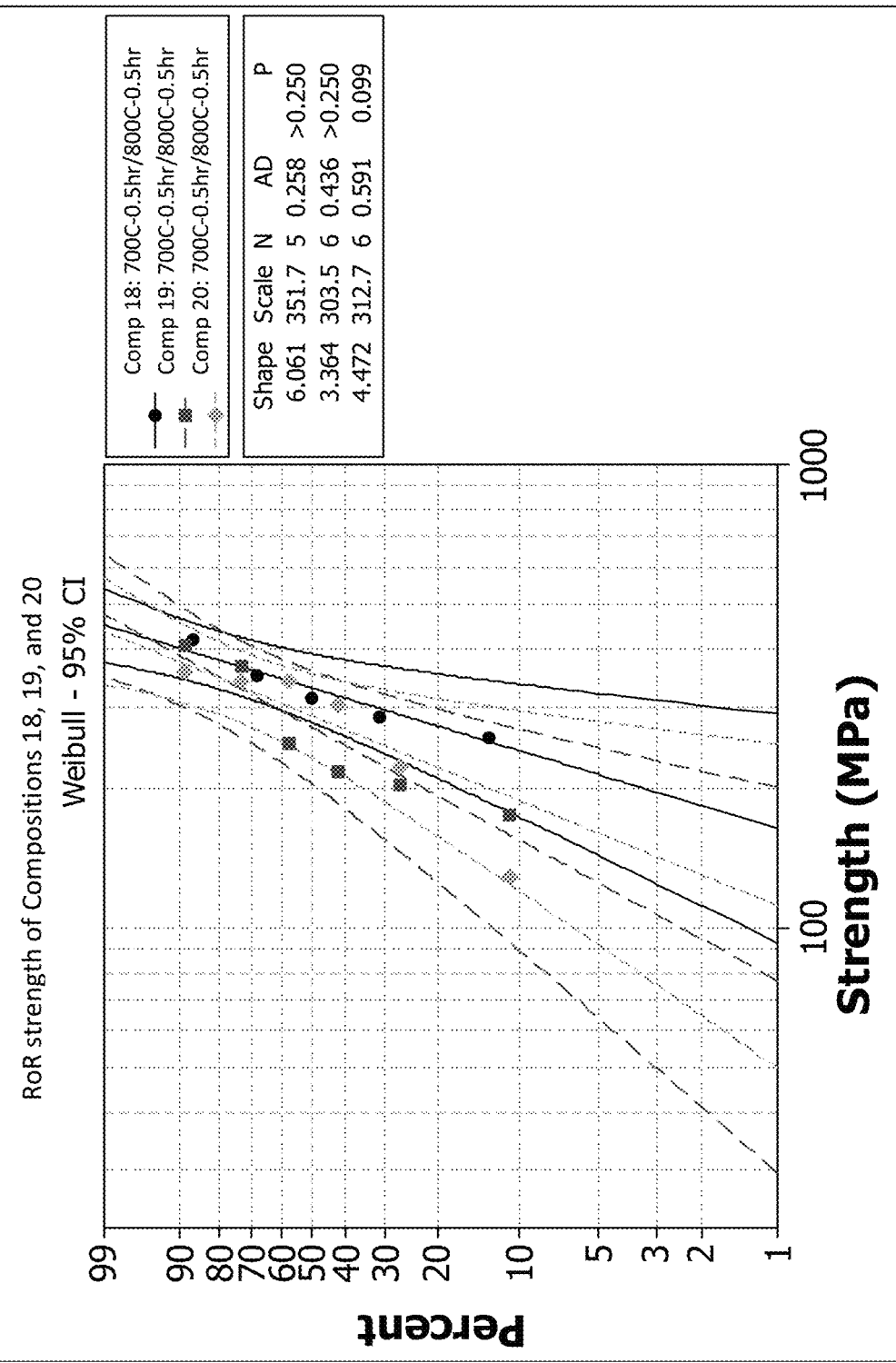
FIG. 13 shows the results of a ring-on-ring (RoR) test of an exemplary glass-ceramic composition.

50 mm by 50 mm by 1 mm samples of glass-ceramic Compositions 19, 20, and 21 were subjected to a ring-on-ring test as described above to determine the strength of the samples. FIG. 13 shows the results of the ring-on-ring test. A strength of 352 MPa, 304 MPa, and 313 MPa was achieved for the ring-on-ring test respectively. Thus, a strength of over 300 MPa can be achieved for the translucent glass ceramics disclosed herein.

Figure 14:
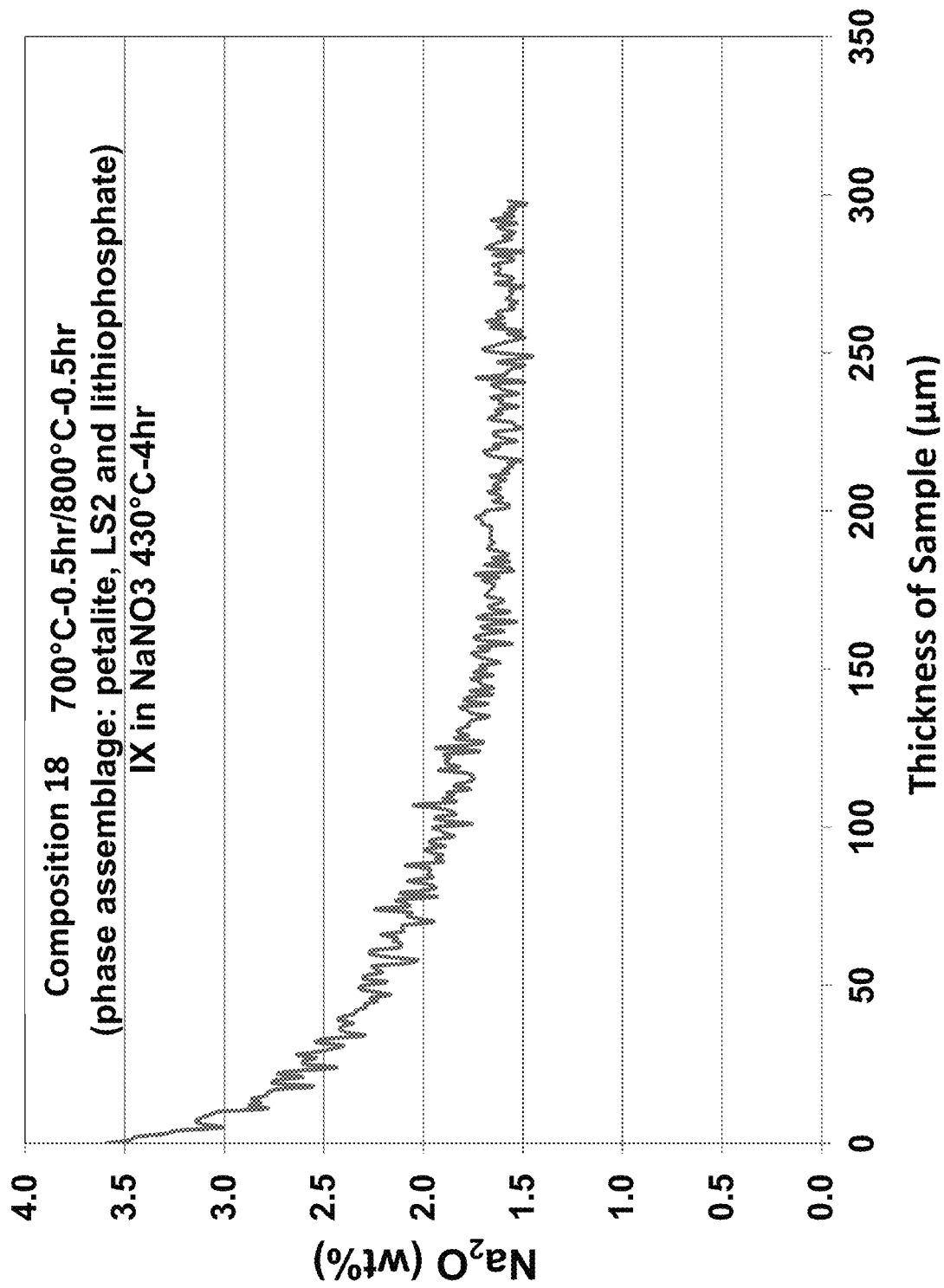
FIG. 14 shows a plot of concentration of $Na_2O$ in weight percent vs. thickness of the sample for an exemplary glass-ceramic composition.

A glass-ceramic of composition 18 formed by batching a $Na_2O$ concentration of 1.4 mol % into the bulk glass was subjected to an ion-exchange process wherein the sample was placed in a molten $NaNO_3$ bath at 430° C. for 4 hours. As shown in FIG. 14, a depth of layer of over 100 µm was achieved. FIG. 14 also shows a plot of the concentration of $Na_2O$ in weight percent vs. thickness of the sample.

While embodiments and examples have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass-ceramic article comprising, in wt %:

| | wt % |
|---|---|
| $SiO_2$ (wt %) | 65-80 |
| $Al_2O_3$ (wt %) | 5-16 |
| $B_2O_3$ (wt %) | 0-6 |
| $Li_2O$ (wt %) | 8-15 |
| $Na_2O$ (wt %) | Greater than 0, to 5 |
| $K_2O$ (wt %) | 0-3 |
| ZnO (wt %) | 0-2 |
| $ZrO_2$ (wt %) | 1-15 |
| $P_2O_5$ (wt %) | Greater than 0, to 6 | wherein the glass-ceramic article comprises 20 wt % to 70 wt % of a petalite crystalline phase.

2. The glass-ceramic article of claim 1, further comprising a lithium silicate crystalline phase, wherein the article is transparent and has a transmittance of at least 85% for light in a wavelength range from 400 nm to 1,000 nm at a thickness of 1 mm.

3. The glass-ceramic article of claim 2, wherein the lithium silicate crystalline phase comprises 20 to 60 wt % of the glass ceramic article.

4. The glass-ceramic article of claim 3, wherein the lithium silicate crystalline phase is a lithium disilicate crystalline phase or a lithium metasilicate crystalline phase.

5. The glass-ceramic article of claim 1, wherein the glass-ceramic article has a fracture toughness of 1 MPa·m$^{1/2}$ or greater.

6. The glass-ceramic article of claim 1, wherein the glass-ceramic article has a fracture toughness of 1.2 MPa·m$^{1/2}$ or greater.

7. The glass-ceramic article of claim 6, wherein the glass-ceramic article has a Vickers hardness of 600 kgf/mm$^2$ or greater.

8. The glass-ceramic article of claim 7, wherein the glass-ceramic article has a ring-on-ring strength of at least 300 MPa.

9. A method of forming a glass-ceramic article, the method comprises:

forming a glass composition comprising, in wt %:

|  | wt % |
| --- | --- |
| SiO$_2$ (wt %) | 65-80 |
| Al$_2$O$_3$ (wt %) | 5-16 |
| B$_2$O$_3$ (wt %) | 0-6 |
| Li$_2$O (wt %) | 8-15 |
| Na$_2$O (wt %) | Greater than 0, to 5 |
| K$_2$O (wt %) | 0-3 |
| ZnO (wt %) | 0-2 |
| ZrO$_2$ (wt %) | 1-15 |
| P$_2$O$_5$ (wt %) | Greater than 0, to 6; | and ceramming the glass composition to form a glass-ceramic article comprising a lithium silicate crystalline phase and 20 wt % to 70 wt % of a petalite crystalline phase, wherein the article is transparent and has a transmittance of at least 85% for light in a wavelength range from 400 nm to 1,000 nm at a thickness of 1 mm.

10. The method of claim 9, wherein the glass-ceramic article has a fracture toughness of 1 MPa·m$^{1/2}$ or greater.

11. The method of claim 9, wherein the glass-ceramic article has a fracture toughness of 1.2 MPa·m$^{1/2}$ or greater.

12. A glass-ceramic article comprising, in wt %:

|  | wt % |
| --- | --- |
| SiO$_2$ (wt %) | 65-80 |
| Al$_2$O$_3$ (wt %) | 7-10 |
| B$_2$O$_3$ (wt %) | 0-6 |
| Li$_2$O (wt %) | 10-20 |
| Na$_2$O (wt %) | Greater than 0, to 5 |
| K$_2$O (wt %) | 0-3 |
| ZnO (wt %) | 0-2 |
| ZrO$_2$ (wt %) | 3-15 |
| P$_2$O$_5$ (wt %) | 0 to 6 | wherein the glass-ceramic article comprises 20 wt % to 70 wt % of a petalite crystalline phase.

13. The glass-ceramic article of claim 12, further comprising a lithium silicate crystalline phase, wherein the article is transparent and has a transmittance of at least 85% for light in a wavelength range from 400 nm to 1,000 nm at a thickness of 1 mm.

14. The glass-ceramic article of claim 13, wherein the lithium silicate crystalline phase comprises 20 to 60 wt % of the glass ceramic article.

15. The glass-ceramic article of claim 14, wherein the lithium silicate crystalline phase is a lithium disilicate crystalline phase or a lithium metasilicate crystalline phase.

16. The glass-ceramic article of claim 12, wherein the glass-ceramic article has a fracture toughness of 1 MPa·m$^{1/2}$ or greater.

17. The glass-ceramic article of claim 12, wherein the glass-ceramic article has a fracture toughness of 1.2 MPa·m$^{1/2}$ or greater.

18. The glass-ceramic article of claim 17, wherein the glass-ceramic article has a Vickers hardness of 600 kgf/mm$^2$ or greater.

19. The glass-ceramic article of claim 18, wherein the glass-ceramic article has a ring-on-ring strength of at least 300 MPa.

20. A method of forming a glass-ceramic article, the method comprises:

forming a glass composition comprising, in wt %:

|  | wt % |
| --- | --- |
| SiO$_2$ (wt %) | 65-80 |
| Al$_2$O$_3$ (wt %) | 7-10 |
| B$_2$O$_3$ (wt %) | 0-6 |
| Li$_2$O (wt %) | 10-20 |
| Na$_2$O (wt %) | Greater than 0, to 5 |
| K$_2$O (wt %) | 0-3 |
| ZnO (wt %) | 0-2 |
| ZrO$_2$ (wt %) | 3-15 |
| P$_2$O$_5$ (wt %) | 0 to 6; | and ceramming the glass composition to form a glass-ceramic article comprising a lithium silicate crystalline phase and 20 wt % to 70 wt % of a petalite crystalline phase, wherein the article is transparent and has a transmittance of at least 85% for light in a wavelength range from 400 nm to 1,000 nm at a thickness of 1 mm.

21. The method of claim 20, wherein the glass-ceramic article has a fracture toughness of 1 MPa·m$^{1/2}$ or greater.

22. The method of claim 20, wherein the glass-ceramic article has a fracture toughness of 1.2 MPa·m$^{1/2}$ or greater.

* * * * *

UNITED STATES PATENT AND TRADEMARK OFFICE
CERTIFICATE OF CORRECTION

PATENT NO. : 11,148,968 B2
APPLICATION NO. : 16/835878
DATED : October 19, 2021
INVENTOR(S) : George Halsey Beall et al.

It is certified that error appears in the above-identified patent and that said Letters Patent is hereby corrected as shown below:

On the Title Page

In Column 1, item (60), Related U.S. Application Data, Line 1, delete "(60)" and insert -- (62) --, therefor.

On page 2, in Column 2, item (56), Foreign Patent Documents, Line 7, delete "DE" and insert -- DD --, therefor.

On page 2, in Column 2, item (56), Other Publications, Line 24, delete "35-239." and insert -- 235-239. --, therefor.

On page 3, in Column 1, item (56), Other Publications, Line 7, delete "25iO2" and insert -- 2SiO2 --, therefor.

In the Specification

In Column 1, Line 14 (approx.), delete "Ser. No. 10/427,975" and insert -- No. 10,427,975 --, therefor.

In Column 1, Line 17 (approx.), delete "Ser. No. 10/189,741" and insert -- No. 10,189,741 --, therefor.

In Column 1, Line 19 (approx.), delete "Ser. No. 10/239,780" and insert -- No. 10,239,780 --, therefor.

In Column 1, Line 21 (approx.), delete "No." and insert -- Nos. --, therefor.

In the Claims

In Column 28, Line 48 (approx.), Claim 1, delete "65-80" and insert -- 65-77 --, therefor.
In Column 28, Line 49 (approx.), Claim 1, delete "5-16" and insert -- 5-10 --, therefor.

In Column 28, Line 54 (approx.), Claim 1, table, below "ZrO$_2$ (wt %)   1-15" insert Signed and Sealed this
Tenth Day of May, 2022

Katherine Kelly Vidal
*Director of the United States Patent and Trademark Office*

CERTIFICATE OF CORRECTION (continued)
U.S. Pat. No. 11,148,968 B2

-- CeO$_2$          0-0.4
MnO            0-0.4
Fe$_2$O$_3$          0-0.4 --.

In Column 29, Line 25 (approx.), Claim 9, delete "5-16" and insert -- 5-10 --, therefor.

In Column 29, Line 30 (approx.), Claim 9, table, below "ZrO$_2$ (wt %)     1-15" insert
-- CeO$_2$          0-0.4
MnO            0-0.4
Fe$_2$O$_3$          0-0.4 --.

In Column 30, Line 4 (approx.), Claim 12, table, below "ZrO$_2$ (wt %)     3-15" insert
-- CeO$_2$          0-0.4
MnO            0-0.4
Fe$_2$O$_3$          0-0.4 --.

In Column 30, Line 44 (approx.), Claim 20, table, below "ZrO$_2$ (wt %)     3-15" insert
-- CeO$_2$          0-0.4
MnO            0-0.4
Fe$_2$O$_3$          0-0.4 --.